United States Patent
Riach et al.

(10) Patent No.: US 7,586,492 B2
(45) Date of Patent: Sep. 8, 2009

(54) REAL-TIME DISPLAY POST-PROCESSING USING PROGRAMMABLE HARDWARE

(75) Inventors: Duncan A. Riach, East Sussex (GB); John M. Danskin, Cranston, RI (US); Jonah M. Alben, San Jose, CA (US); Michael A. Ogrinc, San Francisco, CA (US); Anthony Michael Tamasi, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 140 days.

(21) Appl. No.: 11/019,414

(22) Filed: Dec. 20, 2004

(65) Prior Publication Data

US 2006/0132491 A1 Jun. 22, 2006

(51) Int. Cl.
G06F 15/16 (2006.01)
G06F 9/46 (2006.01)
G09G 5/399 (2006.01)

(52) U.S. Cl. .................. 345/502; 345/539; 718/108

(58) Field of Classification Search ............... 345/501, 345/502, 505, 530, 539, 506; 718/108, 107
See application file for complete search history.

(56) References Cited

U.S. PATENT DOCUMENTS

| | | | |
|---|---|---|---|
| 4,654,710 A | 3/1987 | Richard | |
| 4,821,223 A | 4/1989 | David | |
| 5,349,547 A | 9/1994 | Harrand | |
| 5,546,530 A * | 8/1996 | Grimaud et al. | 345/505 |
| 5,761,074 A | 6/1998 | Nakamura | |
| 6,188,394 B1 | 2/2001 | Morein et al. | |
| 6,243,107 B1 * | 6/2001 | Valtin et al. | 345/506 |
| 6,374,279 B1 | 4/2002 | Young | |
| 6,407,741 B1 | 6/2002 | Morein et al. | |
| 6,424,343 B1 | 7/2002 | Deering et al. | |

(Continued)

FOREIGN PATENT DOCUMENTS

CN 1549964 A 11/2004

OTHER PUBLICATIONS

"Multisampling Anti-Aliasing: A Closeup View." May 22, 2003. http://www.3dcenter.de/artikel/multisampling_anti-aliasing/index2_e.php.*

*Primary Examiner*—Kee M Tung
*Assistant Examiner*—Joni Hsu
(74) *Attorney, Agent, or Firm*—Townsend and Townsend and Crew LLP

(57) ABSTRACT

In a graphics processor, a rendering object and a post-processing object share access to a host processor with a programmable execution core. The rendering object generates fragment data for an image from geometry data. The post-processing object operates to generate a frame of pixel data from the fragment data and to store the pixel data in a frame buffer. In parallel with operations of the host processor, a scanout engine reads pixel data for a previously generated frame and supplies the pixel data to a display device. The scanout engine periodically triggers the host processor to operate the post-processing object to generate the next frame. Timing between the scanout engine and the post-processing object can be controlled such that the next frame to be displayed is ready in a frame buffer when the scanout engine finishes reading a current frame.

26 Claims, 11 Drawing Sheets

U.S. PATENT DOCUMENTS

| | | | |
|---|---|---|---|
| 6,452,595 B1 * | 9/2002 | Montrym et al. | 345/426 |
| 6,496,160 B1 | 12/2002 | Tanner et al. | |
| 6,680,739 B1 | 1/2004 | Robertus et al. | |
| 6,731,288 B2 * | 5/2004 | Parsons et al. | 345/502 |
| 6,778,188 B2 | 8/2004 | Emberling | |
| 6,919,900 B2 * | 7/2005 | Wilt | 345/535 |
| 6,930,663 B2 * | 8/2005 | Sekiya et al. | 345/87 |
| 7,234,144 B2 * | 6/2007 | Wilt et al. | 718/104 |
| 2005/0140688 A1 * | 6/2005 | Pallister | 345/582 |

* cited by examiner

REAL-TIME DISPLAY POST-PROCESSING USING PROGRAMMABLE HARDWARE

BACKGROUND OF THE INVENTION

The present invention relates in general to graphics processors, and in particular to real-time display post-processing using programmable hardware.

Computer-based image rendering usually begins with a geometric representation of a scene. Various objects are described as collections of "primitives" (usually simple polygons such as triangles, as well as points and lines) that can be placed in a scene. A viewing coordinate system is chosen, and the primitives are transformed into that system. The primitives are then converted to a two-dimensional (2-D) "fragment" array representation, where each fragment has a color and may have other attributes such as a depth coordinate or surface normal. Lighting, textures, fog and various other effects that enhance visual realism may be introduced at the primitive and/or fragment stages. At the end of the rendering process, data for each fragment (generally at least the color value) is stored in an image buffer. The image buffer is read out by a "scanout" process that operates isochronously to deliver pixels to a display device at a prescribed screen refresh rate. Real-time animation requires that the rendering process deliver new images at a rate of around 30 Hz. Typical display devices operate at screen refresh rates of around 60-80 Hz.

To meet these processing rate requirements, many computer systems include a dedicated graphics co-processor that performs rendering operations on data provided by the central processing unit (CPU) and also performs the isochronous scanout operation to drive the display device. Typical graphics processors include a rendering object and a scanout engine that operate asynchronously with each other. The rendering object generates fragment data for a new image in a "back" image buffer while the scanout engine drives the display using a previously rendered image in a "front" image buffer. When rendering of the new image is complete, the "back" and "front" buffers are switched, so that the scanout engine begins displaying the newly rendered image while the rendering object moves on to the next image. In general, the scanout engine may read the same image two or three times before rendering of the next image is complete.

The rendering object and the scanout engine are usually very different in implementation. The rendering object is generally flexible and programmable. Typical rendering objects include an execution core (or a number of parallel execution cores) with functional units that can be instructed to execute an arbitrary sequence of operations. With suitable programming, the execution core can be made to execute any combination of rendering algorithms to generate a particular image, and the algorithms can be varied as desired.

The scanout engine, in contrast, usually has limited processing capability and is not programmable. Instead, the scanout engine has a sequence of pipelined special-purpose processing circuits through which the fragment data flows, with the processing circuits performing various operations to transform the fragment data to pixel values. For example, some scanout engines support adding overlays (e.g., cursors or video overlays) that may update at higher rates than the rendered image; color correction (e.g., gamma correction to account for nonlinearity in the display response); or filtering of the fragment data to match the number of pixels on the screen (e.g., for antialiasing). The special-purpose circuits are generally designed to operate with fixed latency, to ensure that pixel data is delivered isochronously to the display device.

In some processors, it is possible to enable or disable various scanout-time operations (e.g., overlays can be turned on or off) or to change parameters of the operations (e.g., parameters for gamma correction or the position of an overlay). But because each operation is implemented in a different special-purpose circuit, it is generally not possible to add a new operation to the pipeline, to change the sequence of operations, or to change the algorithm implementing a particular operation without building a different scanout engine. Thus, the ability to reconfigure a scanout engine is very limited. Adding a new feature generally requires changes to the circuit, which can affect chip area and scheduling, adding cost and delay.

As real-time rendering techniques continue to advance, a more powerful and flexible scanout engine that can add a variety of effects at the display rate has become increasingly desirable. In addition, the range of display devices that can be driven by graphics processors has increased; besides conventional CRT monitors, graphics processing devices can be used to drive LCD monitors, digital micromirror projectors, plasma monitors, and so on. Each type of display device has different requirements for driving its pixels, and it is difficult to accommodate all of these requirements in a single hardware pipeline. Greater flexibility in the fragment-to-pixel conversion process is thus highly desirable.

It would therefore be desirable to provide a graphics processor with the ability to execute arbitrary sequences of operations at display cadence.

BRIEF SUMMARY OF THE INVENTION

Embodiments of the present invention provide graphics processors in which a rendering object and a post-processing object share access to a host processor with a programmable execution core. The rendering object operates to generate fragment data for an image from geometry data and to write the fragment data to an image buffer. The post-processing object operates to generate a frame of pixel data from the fragment data in one or more completed image buffers and to write the pixel data to a frame buffer. In parallel with operations of the host processor, a scanout engine reads pixel data for a previously generated frame from a frame buffer and supplies the pixel data to a display device. The scanout engine periodically triggers the host processor to operate the post-processing object to generate the next frame. Timing between the scanout engine and the post-processing object is advantageously controlled such that the next frame to be displayed is ready in a frame buffer when the scanout engine finishes reading a current frame.

According to one aspect of the present invention, a graphics processor includes a programmable execution core, an arbitration unit, and a scanout engine. The programmable execution core is configured to be switchable among a number of contexts and is further configured to execute program instructions associated with a switched-to context. The arbitration unit is coupled to the execution core and configured to control switching of the execution core between different contexts. The scanout engine is configured to isochronously transmit frames of generated pixel data to a display port and coupled to periodically transmit a trigger signal to the arbitration unit. The contexts include a rendering context having associated therewith a first sequence of program instructions for generating image data and a post-processing context having associated therewith a second sequence of program instructions for generating a frame of pixel data from the image data. The arbitration unit is further configured to switch the execution core to the post-processing context in response to the trigger signal. In some embodiments, the scanout engine is further configured such that the trigger signal has a substantially fixed time relationship to an end of frame event.

In some embodiments, the arbitration unit is further configured to maintain the execution core in the post-processing context until a frame termination event is detected in the second stream of program instructions and thereafter to switch the execution core to the rendering context. The frame termination event may correspond, for example, to an occurrence, in the second stream of program instructions, of an unconditional jump instruction targeting a beginning point of the second stream of program instructions.

According to another aspect of the present invention, a method for generating images is provided. In a shared execution core of a processor, a rendering object is operated; the rendering object generates fragment data for images in response to a first sequence of program instructions. In parallel with operating the rendering object, a scanout engine is operated to isochronously deliver frames of pixel data to a display device; the scanout engine periodically generates a trigger signal. In response to the trigger signal, a post-processing object is operated in the shared execution core of the processor; the post-processing object generates a new frame of pixel data from the fragment data for one or more images in response to a second sequence of program instructions, and the new frame of pixel data is made available to the scanout engine. In some embodiments, the second sequence of program instructions may include, e.g., instructions for downfiltering the fragment data for an image; instructions for upfiltering the fragment data for an image; instructions for computing an LCD overdrive value for each pixel of the frame; and/or instructions for forming a composite image using fragment data for two or more different images.

According to yet another aspect of the invention, a graphics processing system includes image buffers, frame buffers, and a multiprocessor. Each image buffers is configured to store fragment data for an image, and each frame buffer is configured to store pixel data for a frame. The multiprocessor includes a programmable execution core, an arbitration unit, and a scanout engine. The programmable execution core is configured to be switchable among a number of contexts such that the execution core executes program instructions associated with a switched-to context. The arbitration unit is coupled to the execution core and is configured to control switching of the execution core between different contexts. The scanout engine is configured to isochronously transmit frames of pixel data from the frame buffers to a display port and coupled to periodically transmit a trigger signal to the arbitration unit of the multiprocessor. The contexts include a rendering context having associated therewith a first sequence of program instructions for generating fragment data for images and writing the fragment data for each image to one of the image buffers and a post-processing context having associated therewith a second sequence of program instructions for generating a frame of pixel data from the fragment data in the image buffers and for writing the pixel data for the frame to one of the frame buffers. The arbitration unit is further configured to switch the execution core to the post-processing context in response to the trigger signal.

The following detailed description together with the accompanying drawings will provide a better understanding of the nature and advantages of the present invention.

DETAILED DESCRIPTION OF THE INVENTION

Overview and Terminology

Figure 1:
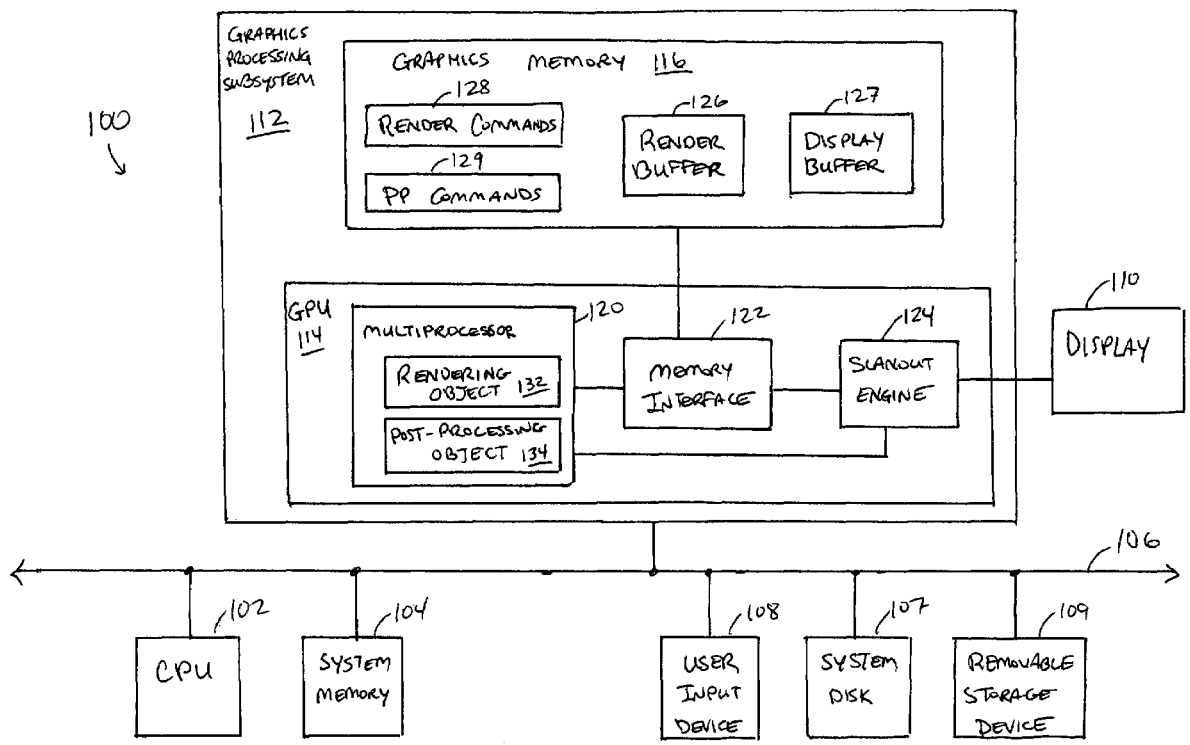
FIG. 1 is a high-level block diagram of a computer system according to an embodiment of the present invention.

Embodiments of the present invention provide graphics processors in which a rendering object and a post-processing object share access to a host processor with a programmable execution core. The rendering object, which operates at a rendering cadence, generates fragment data for an image from geometry data and writes the fragment data to an image buffer. The post-processing object, which operates at a scanout (display) cadence, generates pixel data from the fragment data in one or more completed image buffers and writes the pixel data to a frame buffer. In parallel, a scanout engine reads pixel data for a previously generated frame from a different frame buffer and supplies the pixels to a display device. Synchronously with the scanout operation, the scanout engine triggers the host processor to execute the post-processing object at the scanout cadence so that the next frame will be ready when the scanout engine finishes reading a current frame.

The following terminology is used herein:

The term "image" refers to an array of "fragments" that make up a representation of some picture, where each fragment has a color and may have other attributes, such as depth, transparency, and so on. Fragment color may be represented in any convenient format, including red/green/blue (RGB), luminance-chrominance (YCrCb), hue/lightness/saturation (HLS), monochromatic intensity values, or other formats, and with any desired degree of resolution. The fragments are not required to have any particular relationship, in number or arrangement, to pixels of a display device, and the array of fragments might or might not have uniform spacing between fragments.

"Rendering" refers generally to a process of generating an image, or fragment data, from scene data, which typically includes primitives and related geometry data. A rendering process may include many stages, such as vertex processing (transformation to screen space), setup (selecting primitives and attributes of interest in the screen space), rasterization (sampling an array of fragment locations to determine which primitive(s) cover each fragment), shading (generating attributes for a fragment based on which primitive(s) cover the fragment), and post-shading raster operations (transforming the fragment array, e.g., by downfiltering). Rendering of images generally happens with an average speed ("rendering cadence") that in some embodiments is a speed suitable for animation, e.g., around 30 images per second. The details of rendering processes are not critical to the present invention, and the rendering speed may be subject to fluctuations from image to image.

Rendered images are displayed on a display device that uses an array, or raster, of "pixels," each of which displays a color in response to a driving signal that is a function of the pixel value. As noted above, a pixel of the display device might or might not correspond to a single fragment of the rendered image. "Frame" as used herein refers generally to a complete set of pixel values for the pixel raster. New frames are displayed at a prescribed screen refresh rate or "display cadence" (e.g., 80 Hz), which may be a user selectable parameter. Consecutive frames may display the same image or different images.

"Post-processing" refers generally to processing of fragment data for one or more images to generate a frame of pixel data. Post-processing is advantageously done at a display cadence (the screen refresh rate), which is generally higher than animation speed. Many post-processing operations may be implemented in accordance with the present invention. The following are some examples; it is to be understood that the invention is not limited to any particular combination or sequence of post-processing operations.

One post-processing operation is filtering, which involves blending values of different fragments from one image to obtain a single pixel value. Filtering can result in a number of pixels that is different from the number of fragments. In one embodiment, fragments can be downfiltered to produce a number of pixels that is less than the number of fragments. For instance, each pixel value may be a weighted average of neighboring fragment values. Downfiltering might be used to reduce an image size, to implement antialiasing as the final stage of an oversampling (e.g., multisampling) operation, and so on. Alternatively, fragments can be upfiltered to produce a number of pixels that is greater than the number of fragments. For instance, interpolation can be used to add additional pixel values between or in place of input fragment values. Upfiltering might be used, e.g., to enlarge an image for display.

Another post-processing operation is compositing, which refers generally to combining fragments from two or more images into a final image. For example, a cursor image may be overlaid on a portion of the screen image, or a video image (such as a movie) might be overlaid in a window on a desktop. In some embodiments, the images being combined may update at different rates, making it difficult to correctly combine the images except at the display cadence. In some embodiments, compositing may also include blending images to produce transitional effects such as fade-in, fade-out or dissolve. For these effects, old and new images can be blended using respective weights that vary as a function of time.

Still another post-processing operation is surface mapping, which refers generally to mapping the fragment data for an image onto a 2-D or 3-D surface and projecting that surface onto a pixel array. In one embodiment, the fragment data can be mapped onto a trapezoidal surface to provide "keystone" correction for display devices that are projectors; the shape and size of the trapezoidal surface can be adjusted by a user to compensate for the well-known distortion that occurs when the axis of the beam from the projector is not normal to the screen or other display surface. In other embodiments, the fragment data can also be mapped onto a surface of arbitrary shape, which may be defined so as to produce a desired visual effect or so as to support projection onto a non-planar surface (e.g., a cylinder or dome) with reduced distortion.

A further post-processing operation is surface rotation, which refers to mapping the fragment data for an image onto a 2-D surface that has been rotated through some angle (e.g., a multiple of 90°) about an axis normal to the image. For example, a clockwise rotation by 90° would result in the fragment in the upper left corner of the image appearing at the upper right corner of the pixel array, horizontal lines in the image becoming vertical lines in the pixel array, and so on. Surface rotation may be viewed as a special case of the surface mapping operation described above. In one embodiment, surface rotation is used for display devices that are rotatably mounted, as is the case for tablet PC displays and some flat panel monitors.

Yet another post-processing operation is luminosity compensation. For example, when an image is projected onto a screen, pixels that are farther away from the projector tend to be dimmer than nearer pixels. Or, if the ambient light around the screen is not uniform, part of the screen may appear brighter than the rest. Luminosity compensation can correct for such effects by varying pixel intensity as a function of screen position, and the user may be able to adjust various luminosity compensation parameters as desired.

Other post-processing operations compensate for properties of a particular display device. For example, gamma correction is often used to exponentially scale pixel values in order to compensate for nonlinear voltage response in display devices driven by analog signals. As another example, in LCD monitors, response time can be improved by providing a driving value for each pixel that depends in part on the desired intensity and in part on the amount by which the intensity is changing relative to a previous frame. Other compensation operations specific to other types of display devices may also be implemented in post-processing.

In some embodiments, post-processing operations are operations that should be done at the display cadence in order to produce correct results, such as LCD overdrive or compositing. Where rendering is asynchronous with scanout, it is often difficult or impossible to determine at the time of rendering how the rendering cadence will mesh with the display cadence, and consequently it would also be difficult or impossible to ensure correct results if the operation were to be done during rendering.

"Scanout" refers generally to transferring the pixel data for a frame (after post-processing) to an output path that connects to a display device. Like post-processing, scanout occurs at the display cadence. In some embodiments, the pixel data generated by post-processing is already in the appropriate format for driving the display device. In other embodiments, scanout may include transforming the pixel data to the appropriate format and may include rescaling, digital-to-analog conversion and other signal processing techniques.

System Overview

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 107 and other components, such as one or more removable storage devices 109 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a multiprocessor 120, a memory interface module 122, and a scanout engine 124.

Multiprocessor 120 may be configured to perform rendering and post-processing tasks for graphics processing subsystem 112. Multiprocessor 120 includes a programmable execution core (not explicitly shown in FIG. 1) and is capable of concurrent execution of two or more processes. One process is a "rendering object" 132 that is advantageously configured to generate image (fragment) data from 2-D or 3-D scene data provided by various programs executing on CPU 102. Another process is a "post-processing object" 134 that is configured to transform the fragment data to pixel data ready for display on display device 110. In one embodiment, only one of these processes is active in multiprocessor 120 at any given time; different processes can be switched in and out to provide the effect of concurrent processing. In some embodiments, rendering object 132 and post-processing object 134 may be implemented in the same physical processing engine, which is advantageously capable of context switching to support both objects; in other embodiments, rendering object 132 and post-processing object 134 are implemented in separate processing engines, and context switching between them is not required. Specific embodiments of multiprocessor 120 are described further below.

Memory interface module 122, which communicates with multiprocessor 120 and scanout engine 124, manages all interactions with graphics memory 116. Memory interface module 122 may also include pathways for writing fragment or pixel data received from system bus 106 to appropriate locations in graphics memory 116 without processing by multiprocessor 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a render buffer 126, a display buffer 127, a rendering command buffer 128 and a post-processing (PP) command buffer 129. Render buffer 126 stores fragment data for one or more images generated by rendering object 132 or by various processes executing on CPU 102. Render buffer 126 advantageously buffers multiple different images, including sequences of images generated by the same process, so that while fragment data for a first image is being post-processed, fragment data for a later image can be written to a different area in render buffer 126.

Display buffer 127 stores pixel data generated by post-processing object 134 from fragment data in render buffer 126. Display buffer 127 advantageously stores at least two full frames of pixel data, so that pixel data for one frame can be scanned out from a "front" buffer while pixel data for the next frame is being written to a "back" buffer.

Rendering command buffer 128 and PP command buffer 129 are used to queue commands received via system bus 106 for execution by multiprocessor 120. Commands in rendering command buffer 128 are to be executed by rendering object 132 while commands in PP command buffer 129 are to be executed by post-processing object 134, as described below.

Other portions of graphics memory 116 may be used to store data required by GPU 114 (such as texture data, color lookup tables, etc.), executable program code for GPU 114 and so on.

Scanout engine 124, which may be integrated in a single chip with multiprocessor 120 or implemented in a separate chip, reads pixel data from display buffer 127 and transfers the data to display device 110 to be displayed. In one embodiment, scanout engine 124 operates isochronously, scanning out frames of pixel data at a prescribed screen refresh rate (e.g., 80 Hz) regardless of any other activity that may be occurring in GPU 114 or elsewhere in system 100. In some embodiments, the prescribed refresh rate can be a user selectable parameter, and the scanout order may be varied as appropriate to the display format (e.g., interlaced or progressive scan). Scanout engine 124 may include circuits for data formatting, digital-to-analog conversion, and other signal processing circuitry that converts the pixel data to an appropriate format for the display device. The particular configuration of scanout engine 124 may be varied as desired.

During operation of system 100, CPU 102 executes various programs such as operating system programs, application programs, and one or more driver programs for graphics processing subsystem 112. The driver program may implement conventional application program interfaces (APIs) such as OpenGL, Microsoft DirectX or D3D that enable application and operating system programs to invoke various functions of graphics processing subsystem 112 as is known in the art.

Operation of graphics processing subsystem 112 is advantageously asynchronous with other operations of system 100. For example, in some embodiments, rendering command buffer 128 and PP command buffer 129 queue the commands received via system bus 106 for execution by GPU 114. More specifically, a graphics driver executing on CPU 102 may write a rendering command stream or program to rendering command buffer 128 and a post-processing command stream or program to PP command buffer 129. The command streams are held in their respective command buffers 128, 129 until GPU 114 is ready to process them.

Rendering command buffer 128 is advantageously implemented as a first in, first out buffer (FIFO) that is written by CPU 102 (more specifically, by a graphics driver executing on CPU 102) and read by GPU 114 (more specifically, by rendering object 132 of multiprocessor 120). Reading and writing can occur asynchronously. In one embodiment, the graphics driver periodically writes new commands and data to rendering command buffer 128 at a location determined by a "put" pointer, which the graphics driver increments after each write. Asynchronously, rendering object 132 may sequentially read and process the commands and data previously stored in rendering command buffer 128. Rendering object 132 maintains a "get" pointer to identify the current read location in command buffer 128, and the get pointer is incremented after each read. Provided that the graphics driver stays sufficiently far ahead of rendering object 132, GPU 114 is able to render images without incurring idle time waiting for CPU 102. In some embodiments, depending on the size of the rendering command buffer 128 and the complexity of a scene, the graphics driver may be writing commands and data for several images ahead of the image currently being rendered by rendering object 132. Rendering command buffer 128 may be of fixed size (e.g., 5 megabytes) and may be written and read in a wraparound fashion (e.g., after writing to the last location, the graphics driver may reset the "put" pointer to the first location; similarly, after reading from the last location, rendering object 132 may reset the "get" pointer to the first location).

PP command buffer 129 is advantageously implemented as a circular queue. Rather than writing a new stream of post-processing commands for each frame, the graphics driver program may write a post-processing stream or program once to PP command buffer 129 and write a new stream or program only when the post-processing is to be changed. The post-processing object of multiprocessor 120 executes that stream on each frame as described below, and executed commands may remain in PP command buffer 129 for subsequent re-execution. PP command buffer 129 may be of fixed size (e.g., 1 megabyte), and the command stream may end with an unconditional "jump" command that transfers control back to the beginning of the command stream for processing of the next frame.

In some embodiments, operation of rendering object 132 by multiprocessor 120 is asynchronous with any other operations, while operation of post-processing object 134 is synchronized with operation of scanout engine 124 so that post-processing happens at display cadence. For example, multiprocessor 120 may periodically (e.g., once per scanout frame) suspend rendering object 132 and operate post-processing object 134 for a time long enough to allow post-processing object 134 to generate a frame of screen pixel data and write that data to display buffer 127. Examples of control mechanisms that provide suitable operation are described below.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. The scanout circuitry may be integrated with a GPU or provided on a separate chip and may be implemented, e.g., using one or more ASICs, programmable processor elements, other integrated circuit technologies, or any combination thereof. In addition, GPUs embodying the present invention may be incorporated into a variety of devices, including general purpose computer systems, video game consoles and other special purpose computer systems, DVD players, handheld devices such as mobile phones or personal digital assistants, and so on.

Data Flow View

Figure 2:
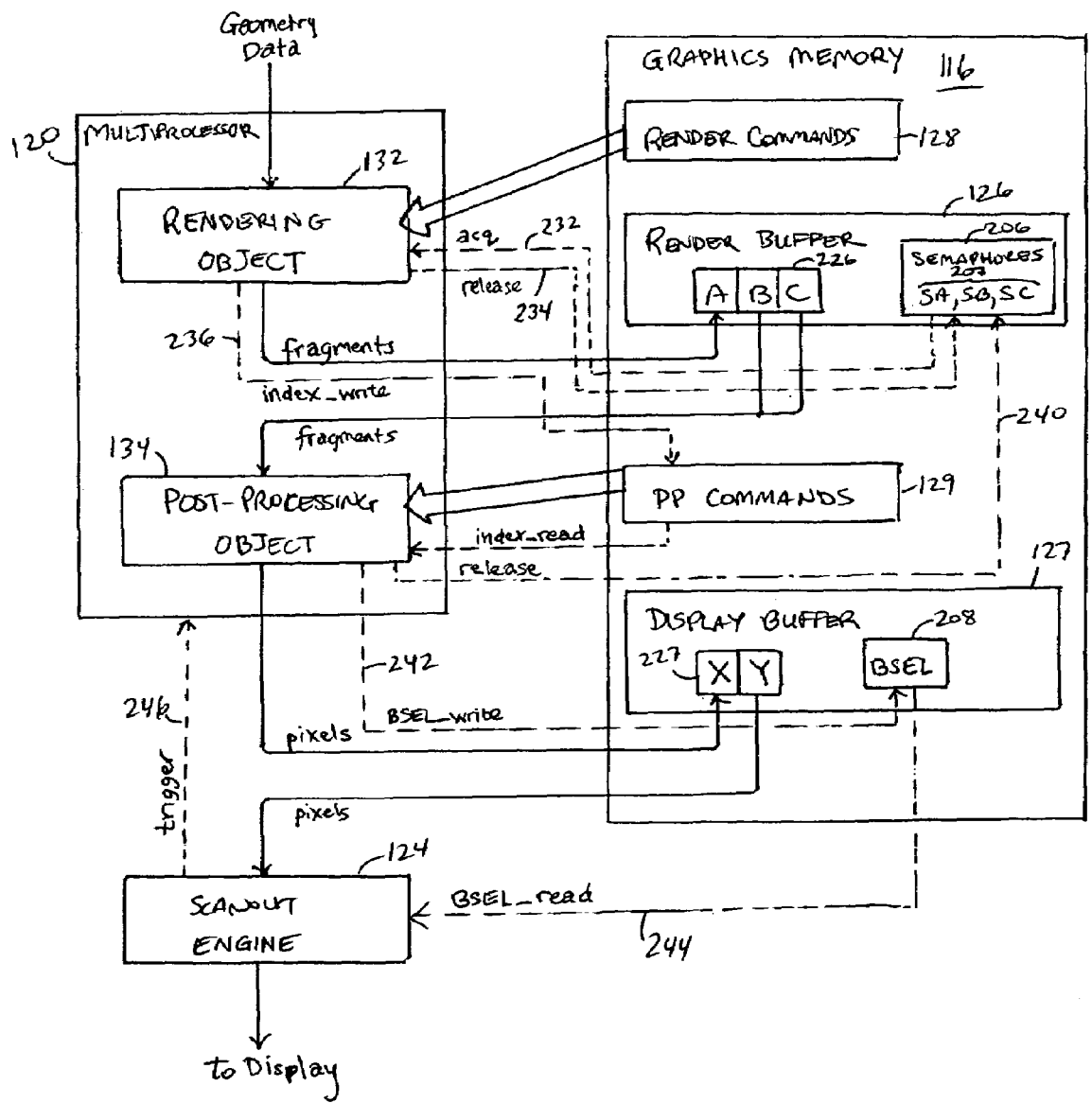
FIG. 2 is a data flow diagram for a graphics processing subsystem according to an embodiment of the present invention.

FIG. 2 is a data flow diagram for graphics processing subsystem 112 that further illustrates a relationship among multiprocessor 120, rendering object 132, post-processing object 134 and scanout engine 124. Data propagation is indicated by solid arrows, command propagation by hollow arrows, and control signal propagation by broken arrows.

In FIG. 2, render buffer 126 is shown as including three image buffers 226 (referred to individually herein as A, B, and C) and a semaphore storage area 206. Image buffers 226 are each large enough to store all of the fragment data for one image, and rendering object 132 is advantageously operated to write all fragment data for one image to buffer A, for the next image to buffer B and so on. It will be appreciated that any number of image buffers 226 might be provided. Semaphore area 206 is used for controlling access to image buffers 226 as described below.

Display buffer 127 is shown as including two frame buffers 227 (referred to individually herein X and Y) as well as a buffer-select (BSEL) storage area 208. Frame buffers 227 are each large enough to store all of the pixel data for a complete frame, and post-processing object 134 may be operated to write one frame to buffer X, the next frame to buffer Y, and so on. BSEL storage area 208 is large enough to store a value that uniquely identifies which one of frame buffers 227 is to be read by scanout engine 124. In one embodiment, BSEL storage area 208 stores a single bit that identifies frame buffer X (if the bit is zero) or frame buffer Y (if the bit is one). In another embodiment, BSEL storage area 208 stores an identifier (e.g., offset value) of a starting address in graphics memory 116 for one of frame buffer X or frame buffer Y. Other identifiers may also be used.

In this embodiment, rendering object 132 receives geometry data, e.g., via system bus 106. The received geometry data may be stored in graphics memory 116, in an on-chip data cache (not shown) of multiprocessor 120, or elsewhere. Rendering object 132 processes the geometry data in accordance with commands provided by rendering command buffer 128 to generate fragment data for an image. The fragment data is written to one of image buffers 226, e.g., to buffer A.

Post-processing object 134 processes fragment data in image buffers 226 in accordance with commands received from PP command buffer 129 to generate pixel data for a frame. The pixel data is written to one of frame buffers 227, e.g., to buffer X. In this embodiment, post-processing object 134 may obtain fragment data from any image buffer 226 except the one that is currently being written by rendering object 132, e.g., from buffers B and/or C if rendering object 132 is writing to buffer A.

Scanout engine 124 reads pixel data from one of frame buffers 227 and provides it to the display device. In this embodiment, scanout engine 124 reads from the frame buffer 227 identified in BSEL storage area 208, which is advantageously not the same as the frame buffer being written by post-processing object 134; e.g., if post-processing object 134 is writing to frame buffer X, then scanout engine 124 would read from buffer Y. Scanout engine 124 may pass the pixel data through unaltered, or it may apply digital-to-analog conversion and/or other signal processing algorithms to properly format the data for delivery to the display device. In some embodiments, all per-frame processing other than digital-to-analog conversion is performed by post-processing object 134 prior to writing the pixel data to a frame buffer 227; in other embodiments, scanout engine 124 may perform some processing.

Scanout engine 124 advantageously synchronizes delivery of pixels for each frame to the display device's requirements and is capable of detecting events such as the end of a row of screen pixels (known in the art as a horizontal retrace) and the end of a screen (known in the art as a vertical retrace). Conventional technologies may be used to implement scanout engine 124.

In an alternative embodiment, scanout engine 124 reads buffers X and Y on alternating frames, and post-processing object 134 writes to buffers Y and X on alternating frames. In this embodiment, BSEL storage area 208 can be used to store a semaphore that is used only at initialization to synchronize operations of scanout engine 124 and post-processing object 134. For example, a semaphore for the first buffer to be scanned out (e.g., buffer X) may be stored in BSEL storage area 208. At system setup, this semaphore, which may be, e.g., a single bit, is set to a locked (or acquired) state that prevents scanout engine 124 from reading buffer X. After post-processing object 134 writes the first frame to buffer X, it releases the semaphore, enabling read operations from buffer X by scanout engine 124. Thereafter, the semaphore can remain in its released state, and proper synchronization will be maintained.

Synchronization Techniques

Operations of scanout engine 124 and post-processing object 134 are advantageously synchronized on a per-frame basis, meaning that for each frame read from display buffer 127 by scanout engine 124, post-processing object 134 writes one new frame to display buffer 127. For instance, post-processing object 134 advantageously writes one frame to frame buffer X while scanout engine 124 reads one frame from frame buffer Y. When scanout engine 124 reaches the end of frame buffer Y, it switches to reading frame buffer X while post-processing object 134 writes one frame to frame buffer Y.

In one embodiment, this synchronization is handled using a trigger signal that is asserted on a "trigger" path 246 by scanout engine 124. The trigger signal is generated once per frame, preferably in a fixed time relationship with an end-of-frame event. The end-of-frame event can be any event that tells scanout engine 124 that is at or near the end of a frame, such as a vertical retrace (or vsync) event, reading the last (or Nth from last) pixel from the current frame buffer, or the like. In response to assertion of the trigger signal, multiprocessor 120 activates post-processing object 134 to generate one new frame of pixel data. After the new frame is generated, multiprocessor 120 deactivates post-processing object 134 until the next assertion of the trigger signal.

Buffer synchronization is advantageously provided to prevent post-processing object 134 from writing to a frame buffer 227 while that buffer is being scanned out. In one embodiment, each time post-processing object 134 finishes generating a new frame, it writes an identifier of the frame buffer 227 (e.g., X or Y) for the new frame into BSEL storage area 208, as indicated by "BSEL_write" path 242. At the beginning of each frame, scanout engine 124 determines which frame buffer 227 to read by accessing BSEL storage area 208, as indicated by "BSEL_read" path 244. As long as BSEL storage area 208 is read only once per frame and written only once per frame, the timing of these operations can be coordinated to avoid race conditions. For instance, scanout engine 124 may access BSEL storage area 208 just before generating the trigger signal, at a time after post-processing object 134 has finished generating the next frame and updating the BSEL value.

Operations of rendering object 132 and post-processing object 134 are advantageously not synchronized with each other, since post-processing object 134 generates frames at the display cadence (i.e., the screen refresh rate) while rendering object 132 generates images at a rendering cadence that may be different from (e.g., slower than) the display cadence. In some embodiments, buffer synchronization techniques are used to avoid situations where post-processing object 134 generates one part of a frame using one image (or group of images) and another part of the same frame using a different image (or group of images), as well as to prevent situations where rendering object 132 writes to an image buffer 226 while post-processing engine 132 is reading from that buffer 226. In particular, access to image buffers 226 may be controlled so that post-processing object 134 does not read from an image buffer 226 that is currently being written by rendering object 132 and so that rendering object 132 does not overwrite an image buffer 226 that is still needed by post-processing object 134. The buffer synchronization mechanism may further provide that any changes in the selection of image buffers to be read by post-processing object 134 occur between post-processing frames; this helps to avoid tearing or other visual inconsistencies in different parts of the displayed frame.

FIG. 2 illustrates, via control signal paths 232, 234, 236 a buffer synchronization technique for image buffers 226 based on asymmetric semaphores and a buffer index. Semaphore area 206 of render buffer 126 stores semaphores 207 (SA, SB, SC) for controlling access by rendering object 132 to each of image buffers 226 so that new fragment data is not written to an image buffer 226 until post-processing object 134 has finished with any old fragment data that might be present in that buffer 226. Each semaphore 207 advantageously has "acquired" and "released" states, which are used for access control as described below. Generally conventional semaphore data structures and formats may be adapted to implement semaphores 207.

Before rendering object 132 begins to write fragment data for a new image, it attempts to acquire the semaphore 207 corresponding to the image buffer 226 to which that fragment data is to be written, as indicated by "acquire" path 232. Rendering object 132 can acquire the semaphore for an image buffer only after post-processing object 134 has released it; as described further below, semaphore releasing occurs when post-processing object 134 no longer requires the associated image buffer. If the semaphore 207 cannot be acquired immediately, rendering object 132 pauses in its command processing and waits until such time as the semaphore can be acquired, then proceeds with rendering. Where post-processing object 134 releases buffers at the display cadence (i.e., once per scanout frame), rendering object 132 will generally not need to wait. In other embodiments, any delay in execution of rendering object 132 may be acceptable as long as it is not desired to render new images at rates faster than the display cadence.

When rendering object 132 finishes writing fragment data for an image to one of the image buffers 226, it releases the semaphore 207 for that buffer, as indicated by "release" path 234. Releasing the semaphore 207 (e.g., semaphore SA) prevents rendering object 132 from accessing the associated buffer 226 (e.g., buffer A) until such time as the semaphore 207 is released by post-processing object 134 as described below. After (or concurrently with) releasing the semaphore 207, rendering object 132 writes a new index value into PP command buffer 129, as indicated by "index-write" path 236. The index value identifies the just-completed image buffer 226 and signals to post-processing object 134 that this image buffer 226 is now available for processing.

At the start of each frame, post-processing object 134 reads the index value from PP command buffer 129, as indicated by "index_read" path 238. In one embodiment, the index is read as an argument of one of the commands in PP command buffer 129. Based on the index value, post-processing object 134 determines which image buffers 226 it needs for post-processing and releases the semaphores 207 for any image buffers 226 that are not needed, as indicated by "release" path 240. Image buffers 226 whose semaphores 207 are released by post-processing object 134 become available for use by rendering object 132.

It should be noted that post-processing object 134 advantageously does not wait or stall if the index value has not changed since the last frame. In some embodiments, post-processing object 134 performs the same post-processing regardless of whether the index value has changed; if the index value has not changed, the new frame generated by post-processing object 134 might be identical to the previous frame. In other embodiments, some or all activity of post-processing object 134 may be made conditional on whether the index has changed. In such embodiments, post-processing object 134 advantageously stores the index value used for the previous frame and compares it to the index value in PP command buffer 129 to determine whether the index has changed. If the index has not changed, post-processing object 134 might simply do nothing or it might execute a different set of instructions.

The synchronization mechanism herein is "asymmetric" in the sense that semaphores 207 can stall the operation of rendering object 132 but not the operation of post-processing object 134. This arrangement permits new frames to be generated at the display cadence, regardless of the rate at which rendering object 132 generates new images. To avoid deadlock, the number of image buffers 226 is advantageously selected to be large enough that there is always at least one image buffer 226 that is not in use by post-processing object 134. For example, if post-processing object 134 requires the M most recent images for the particular operation(s) it is to carry out, then at least M+1 image buffers 226 would be provided. A larger number of image buffers 226 may be provided if desired. Providing additional image buffers allows the rendering engine to operate farther ahead of the scanout engine. The additional image buffers may also be used to implement triple-buffered rendering in rendering object 132 if desired.

It is to be understood that the particular synchronization techniques described herein are illustrative and that other techniques may also be used. Some embodiments may omit buffer synchronization entirely, allowing tearing in displayed frames.

Command Streams

In some embodiments, the rendering command stream and the post-processing command stream are managed differently. More specifically, as noted above, rendering command buffer 128 is advantageously implemented such that rendering commands therein are executed once by rendering object 132; a new set of commands is written to rendering command buffer 128 for each image to be rendered. In contrast, the desired set of post-processing operations is usually consistent from one frame to the next, and writing the same set of post-processing commands for each frame would be inefficient. Where PP command buffer 129 operates in an infinite loop, writing of new post-processing commands to PP command buffer 129 is further complicated. The execution of post-processing object 134 is asynchronous with the graphics driver, and the driver generally does not know whether post-processing object 134 is executing at any given time or which command in the loop is being executed.

Accordingly, PP command buffer 129 is advantageously implemented such that the graphics driver can write an entire program of post-processing commands as a command stream to PP command buffer 129. The program is retained in PP command buffer 129 after execution so that the same program can be re-executed for every frame. Thus, new post-processing commands need be written to PP command buffer 129 only when the post-processing is to be changed.

Example command stream structures for rendering command buffer 128 and PP command buffer 129 will now be described.

Figure 3A:
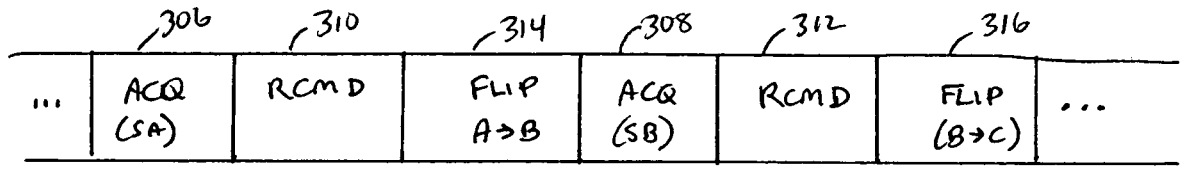
FIG. 3A illustrates a rendering command stream according to an embodiment of the present invention.

FIG. 3A schematically illustrates a portion of a rendering command stream 300 that can be buffered in rendering command buffer 128 according to an embodiment of the present invention. For each new image, the command sequence begins with an "ACQ" command 306, 308 that instructs rendering object 132 to acquire the semaphore 207 for the next image buffer 226 to be written (e.g., semaphore SA for buffer A in the case of ACQ command 306, semaphore SB for buffer B in the case of ACQ command 308) before proceeding. As described above, if the semaphore 207 cannot be acquired, rendering object 132 waits until such time as it can be acquired.

"RCMD" commands 310, 312 each represent a complete set of commands and data for rendering an image. In practice, any number of rendering commands may be included per image. For example, RCMD commands 310, 312 may include any combination of vertex (or geometry) processing commands, rasterizing commands, fragment shading commands and so on. RCMD commands 310, 312 may also include appropriate data (e.g., transformation matrices, groupings of vertices into primitives, etc.) that may be associated with various rendering commands. In some embodiments, rendering commands may be delivered as microinstructions suitable for execution by multiprocessor 120; in other embodiments, decoding of the commands by host 120 prior to execution may be required. In some embodiments, the sequence of rendering commands may also include flow control commands such as loops, if-then statements, and the like. In general, RCMD commands 310, 312 may be conventional in nature, and a detailed description is omitted as not being critical to understanding the present invention.

At the end of each image is a "FLIP" command 314, 316, indicating that rendering of the current image is complete. In response to the FLIP command, rendering object 132 advantageously switches its write target from the current rendering buffer to the next rendering buffer (e.g., from buffer A to buffer B in the case of FLIP command 314) and also releases the semaphore 207 for the just-completed rendering buffer (e.g., semaphore SA in the case of FLIP command 314). After releasing the semaphore 207, rendering object 132 updates the index value in PP command buffer 129 with a new value that identifies the just-completed rendering buffer (e.g., buffer A in the case of FLIP command 314). In addition, processing of a FLIP command may also include resetting counters or other variables that may be maintained by rendering object 132. Other conventional end-of-image processing may also be performed in response to the FLIP command.

Figure 3B:
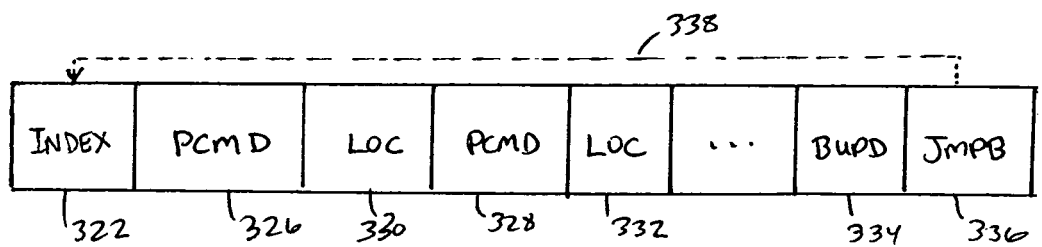
FIG. 3B illustrates a post-processing program according to an embodiment of the present invention.

FIG. 3B schematically illustrates a post-processing program (or stream) 320 that may be stored in PP command buffer 129 according to an embodiment of the present invention. In this embodiment, program 320 implements an infinite loop that includes an index command 322, the argument of which is the index that is written and overwritten by rendering object 132 as described above; one or more post-processing ("PCMD") commands 326, 328; one or more location ("LOC") commands 330, 332; a BSEL update ("BUPD") command 334; and a final unconditional jump ("JMPB") command 336 to return to the beginning of the loop.

Index command 322, which may be executed first, provides the current index value to post-processing object 134. In some embodiments, post-processing object 134 compares the current index value to the most recently used index value, which may be stored in a state register (not shown in FIG. 2 or FIG. 3B) that is accessible to post-processing object 134, and further processing may be controlled based on the result of the comparison. For example, in some instances where the index value has not changed, the next display frame will be identical to the current display frame. In that case, post-processing object 1-34 might not generate a new frame, and it may leave the BSEL value in location 208 (FIG. 2) unmodified so that scanout engine 124 will simply read the same frame buffer 227 multiple times in succession until such time as the index value does change. In other instances, it may be desirable for post-processing object 134 to take some action even if the index value has not changed, such as adjusting LCD overdrive values or progressing through a transitional effect such as fade-in, fade-out or dissolve. In other embodiments, post-processing object 134 executes the same commands regardless of whether the index value has changed. At initialization, the index value may be set to a null value, indicating that no images have been rendered to image buffers 226; post-processing object 134 advantageously detects the null value and takes an appropriate action (e.g., writing a blank-screen value to every pixel in frame buffer 227).

PCMD commands 326, 328 represent instructions for various post-processing operations to be performed. In practice, any number of PCMD commands may be included in contents 320. As with the RCMD (rendering) commands described above, PCMD commands may be delivered in the form of instructions suitable for direct execution by multiprocessor 120; in other embodiments, decoding of the commands by host 120 prior to execution may be required. Again, as with RCMD commands, PCMD commands may include flow-control commands as desired (e.g., some commands may be conditional on whether the index value in index entry 324 has changed).

As described further below, in some embodiments post-processing object 134 is executed using the same processing engine as rendering object 132; accordingly, any sequence of commands that can be given as RCMD commands 310, 312 (FIG. 3A) can also be given as PCMD commands 326, 328. In addition, special PCMD commands specific to post-processing operations may also be defined. In principle, any combination of post-processing operations (including any one or more of the examples mentioned above) may be implemented through a suitable sequence of PCMD commands 326, 328. In some embodiments, PCMD commands 326, 328 are used only for processing that should take place on a per-frame basis, such as LCD overdrive or cursor overlays. It will be appreciated, however, that a wide range of post-processing operations may be programmed via PCMD commands 326, 328.

LOC commands 330, 332 are used in conjunction with index entry 324 to identify one (or more) of image buffers 226 as a data source for a particular PCMD command or group of PCMD commands. Index entry 324, which is written by rendering object 132 in response to a FLIP command as described above, identifies the most recently completed image buffer 226. LOC commands 330, 332 may refer to the most recently completed image buffer 226 or to previously completed image buffers 226 as appropriate. In one embodiment, LOC commands 330, 332 identify image buffers 226 relative to the most recently completed image buffer. For example, suppose there are N image buffers 226 that are assigned index values of 0, 1, . . . , N–1 and that the value in index entry 324 is denoted by R. A LOC command might be of the form LOC=R to identify the most recently completed image buffer, or LOC=(R–1) mod N to identify the second-most recent, and so on. Where relative references are used, it is not necessary to modify LOC commands 330, 332 when index entry 324 is updated. In some embodiments, there may be one LOC command or one set of LOC commands that is applicable to all PCMD commands.

BUPD command 334 and JMPB command 336 conclude the post-processing loop. BUPD command 334 instructs post-processing object 134 to write the identifier of the newly written frame buffer 227 to BSEL storage location 208 so that scanout engine 124 will read it as the next frame. JMPB command 336 returns control back to the beginning of program 320 as indicated by broken arrow 338. As described below, JMPB command 336 can also serve as a completion signal (also referred to herein as a "frame completion event") for the post-processing program; that is, once the JMPB command 334 is encountered by post-processing object 134, it goes into an idle state to await the next trigger event. For instance, as described below, post-processing object 134 may be context-switched out on reaching JMPB command 336.

In some embodiments, some of the PCMD commands 326, 328 may have associated state parameters. For instance, a magnification parameter might be associated with a PCMD command that implements enlargement or reduction, or overlay size or position parameters might be associated with a PCMD command that implements compositing. These parameters may be included in the post-processing command stream or they may be written to a different location accessible to post-processing object 134 (e.g., a parameter section within the PP command buffer, a separate buffer, or parameter registers in the execution core). Parameter updates can be handled by rewriting the post-processing command stream, selectively modifying the post-processing command stream, or modifying the contents of a buffer or register. Modification of commands and parameters is described further below.

It will be appreciated that the program streams described herein are illustrative and that variations and modifications are possible. Any suitable command set may be used to implement RCMD and PCMD commands. Instead of a JMPB command, other conditions might be used as frame completion events to indicate the end of the post-processing program. For example, if the PP command buffer is implemented using a "put" pointer and a "get" pointer (similar to the pointers described above with reference to rendering command buffer 128 in FIG. 1), the "put" pointer will reference the location of the last command in the program. When the "get" pointer references the same location as the "put" pointer, the last command has been reached. This occurrence can also be used as a frame completion event indicating that the post-processing object has finished a frame. In other embodiments, any event or condition uniquely associated with completion of post-processing for a frame may be used as a frame completion event.

Multiprocessor

Figure 4:
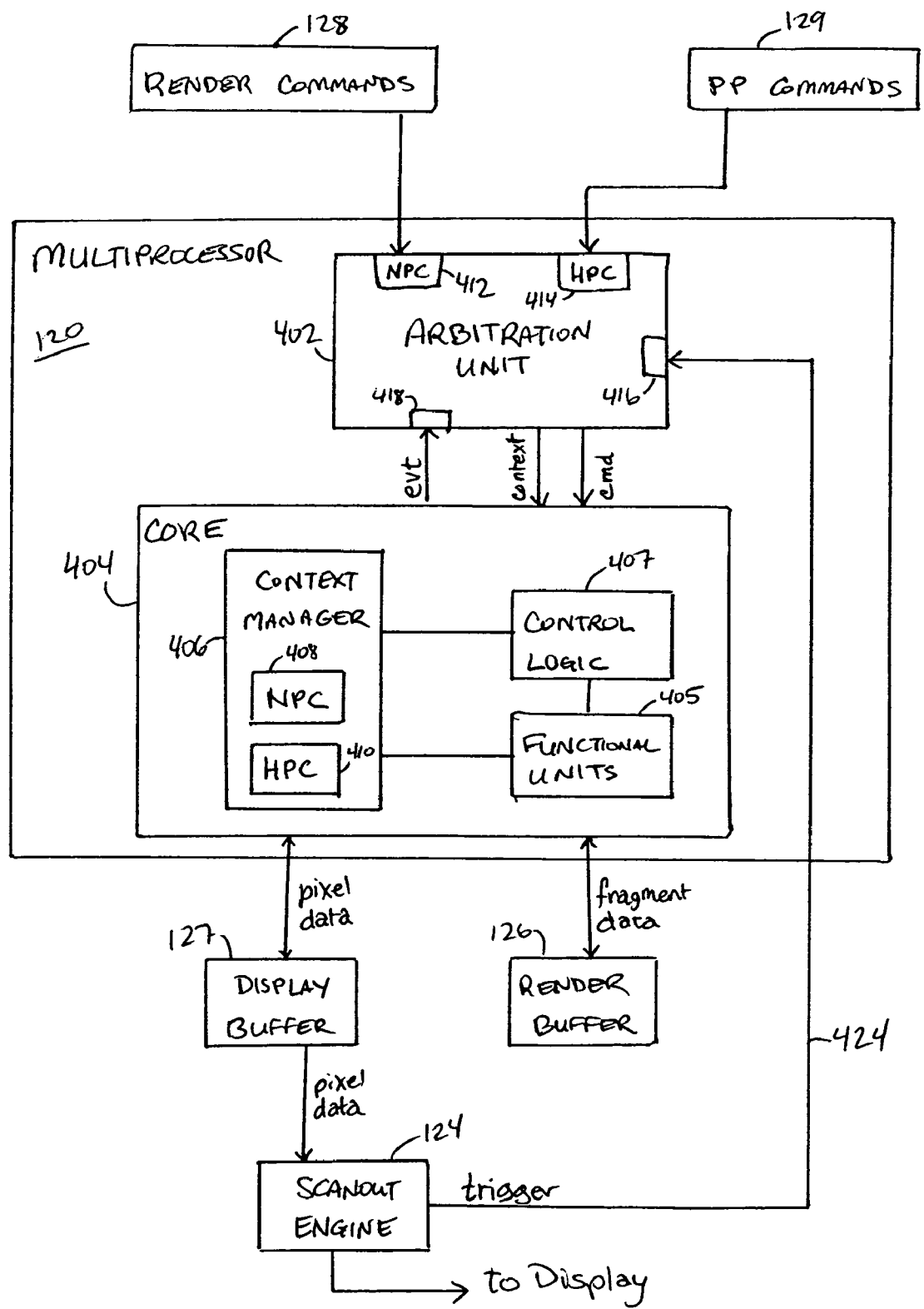
FIG. 4 is a block diagram showing components of a multiprocessor according to an embodiment of the present invention.

FIG. 4 is a simplified block diagram of multiprocessor 120 according to an embodiment of the present invention. Multiprocessor 120 includes an arbitration unit 402, an execution core 404 that includes a context manager 406.

Execution core 404 may be of generally conventional design and may implement any desired microarchitecture and/or instruction set. In some embodiments, execution core 404 includes a number of functional units 405 for performing various operations (add, multiply, vector arithmetic, mathematical functions, filtering algorithms, memory access, etc.), along with associated control logic 407 for decoding incoming commands into executable instructions for the functional units, identifying and collecting required operands for each instruction, issuing instructions to the functional units, and forwarding the results to other functional units or to a register file (not explicitly shown). Execution core 404 may also include various other registers that maintain aspects of hardware state. Execution core 404 is also configured to access render buffers 126 and display buffers 127 (which may be in graphics memory 116 as shown in FIG. 1). In some embodiments, multiple parallel execution cores 404 may be provided, with each core 404 operating on a different portion of a scene, image, or frame. The particular architecture of execution core 404 is not critical to the present invention.

In one embodiment, execution core 404 supports two independent processing channels: a high priority channel (HPC) that implements post-processing object 134 (FIG. 1) and a normal priority channel (NPC) that implements rendering object 132. A separate architectural state (context) is maintained for each channel by context manager 406. More specifically, NPC context block 408 contains the stored architectural state for the NPC, and HPC context block 410 contains the stored architectural state for the HPC. The architectural state may be stored in registers or other suitable hardware.

Context manager 406 provides the functional units 405 and control logic 407 of execution core 404 with access to the appropriate architectural state for the currently active channel, so that a channel that is switched out at some point during its processing can resume at the same point when switched back in. In some embodiments, execution core 404 has an active register set (not shown in FIG. 4), and context manager 406 executes a channel switch (e.g., from the HPC to the NPC) by first copying the architectural state of the "old" channel (e.g., the HPC) from the active register set to the appropriate context block (e.g., HPC context block 410), then copying the architectural state of the "new" channel (e.g., NPC) from the appropriate context block (e.g., the NPC context block 408) into the active register set. In other embodiments, execution core 404 can selectably access a corresponding register in either NPC context block 408 or HPC context block 410, and context manager 406 directs execution core 404 to the appropriate register in a context-dependent manner. The particular implementation of context switching is not critical to the present invention; in some embodiments, any implementation that provides sufficiently fast (e.g., 300 microseconds or faster) context switching may be used.

Arbitration unit 402 determines which channel is to be active at any given time. In one embodiment, arbitration unit 402 has an NPC input 412 that receives a candidate command from rendering command buffer 128 and an HPC input 414 that receives a candidate command from post-processing command buffer 129. Arbitration unit 402 also has a trigger input 416 that receives the trigger signal (described above with reference to FIG. 2) from scanout engine 124, and an event input 418 that receives event signals from execution core 404. Based on these inputs, during each cycle, arbitration unit 402 selects either the HPC or the NPC as an active channel, sends execution core 404 a context signal identifying the selected channel (on path 420), and the candidate command for the selected channel (on path 422). The candidate command that is not selected is presented at the input again on the next cycle, at which time it might or might not be selected. Suitable timing and control circuitry (not shown in FIG. 4) may be used to ensure that selected commands are executed at a time when execution core 404 has the correct context for that command; such circuitry may be of generally conventional design.

Figure 5:
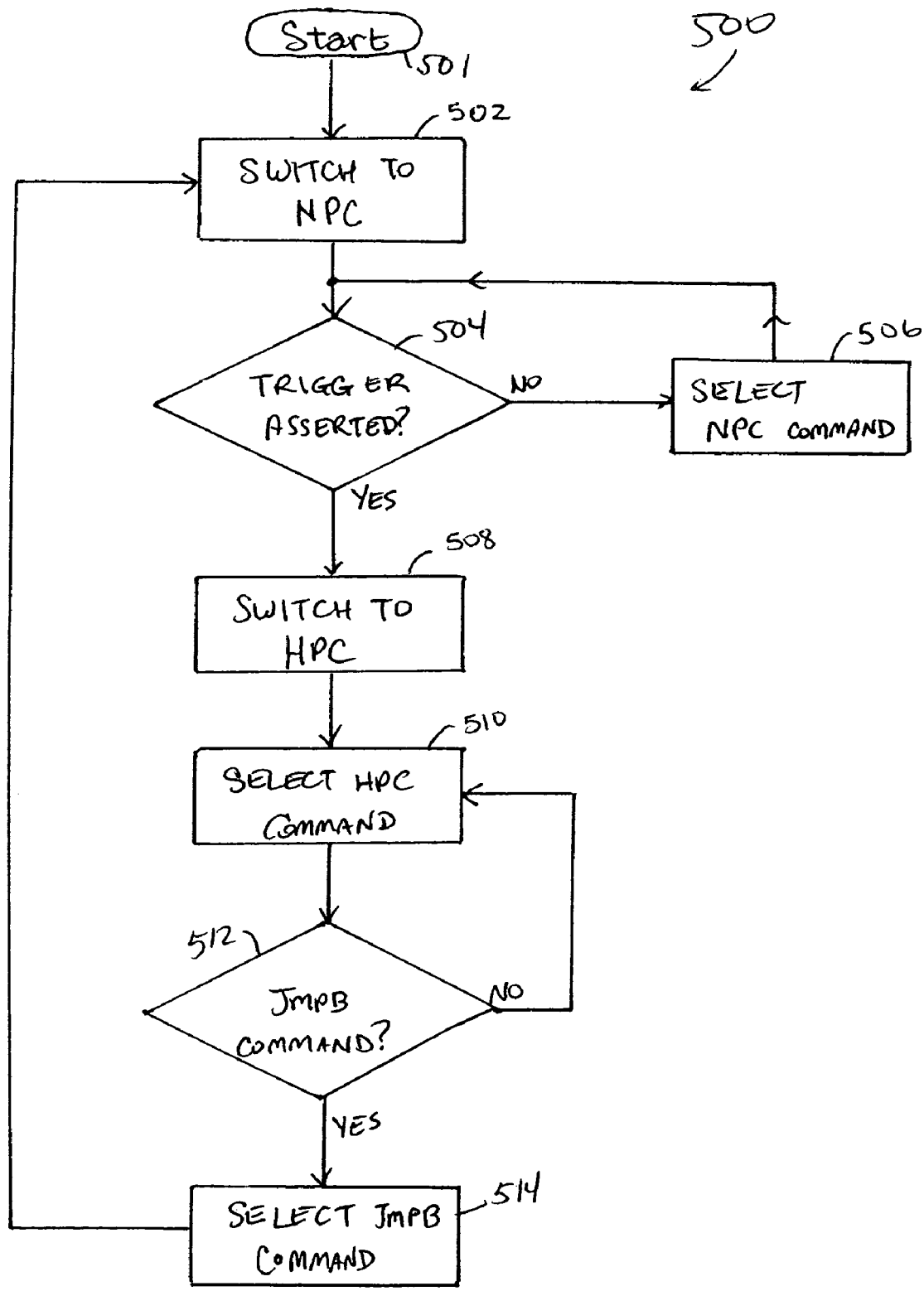
FIG. 5 is a flow diagram of an arbitration logic process according to an embodiment of the present invention.

FIG. 5 is a flow diagram of a selection logic process 500 that may be implemented in arbitration unit 402. In this embodiment, scanout engine 124 generates a trigger signal on path 424 approximately in coincidence with each vertical retrace (or other end-of-frame) event. Post-processing command buffer 129 contains commands for an infinite loop with an unconditional JMPB command, as shown in FIG. 3B.

After initialization (step 501), arbitration unit 402 switches in the NPC (step 502). On each cycle, arbitration unit 402 checks for assertion of the trigger signal (step 504). As long as the trigger signal is not asserted, commands from rendering command buffer 128 continue to be selected (step 506). In accordance with the commands in rendering command buffer 128, images are rendered and the fragment data is written to render buffer 126; in other words, rendering object 132 operates. The HPC is inactive during this time When the trigger signal is detected at step 504, arbitration unit 402 switches, contexts to the HPC (step 508) and begins selecting commands from PP command buffer 129 (step 510). Arbitration unit 402 continues to select commands from PP command buffer 129 until the unconditional JMPB command is detected at step 512. In accordance with the commands in PP command buffer 129, post-processing is performed on the fragment data in render buffer 126, with the resulting screen pixel data being written to display buffer 127; in other words, post-processing object 134 operates. Completion of post-processing for a frame is indicated by the JMPB command, as described above. Once this command is detected (step 512), it is forwarded to core 404 (step 514), after which arbitration unit 402 switches in the NPC context, returning to step 502. In some embodiments, the JMPB command affects only arbitration unit 402 and is not forwarded to core 404. At that point, rendering object 132 resumes.

Process 500 suspends rendering at intervals corresponding to the display frame rate (e.g., 80 Hz) so that post-processing can be done at display cadence. In general, this periodic suspension of rendering in favor of post-processing does not adversely affect overall performance of the graphics subsystem unless the time consumed by post-processing (and therefore unavailable for rendering) is long enough that new images cannot be rendered at the desired speed (e.g., 30 Hz). Given the processing power available in modem execution cores and typical post-processing operation sequences, acceptable performance can be maintained.

It will be appreciated that the multiprocessor and arbitration logic described herein are illustrative and that variations and modifications are possible. "Context switching" is used herein as a general term for describing operation of a processor that can switch from one stream of instructions to another at an arbitrary point in the first stream, then return to the first stream at essentially the same point; the term is limited to any particular processor architecture. Any multitasking architecture, including conventional multithreading architectures, may be employed, and any mechanism may be used to preserve the state of a temporarily idle process or context. In addition, the HPC need not be given absolute priority over the NPC, so long as the HPC can reliably finish generating a new frame on a schedule determined by the display cadence. It should also be noted that the example arbitration logic described herein does not make use of event input 418; different arbitration logic might use this input. For example, post-processing object 134 could generate an event signal on input path 418 to advise arbitration unit 402 that it has finished a frame.

In another embodiment, the rendering object and the post-processing object may be implemented using independent processing engines with separate buffer reading paths. In this embodiment, the rendering object and the post-processing object can execute in parallel, and context-switching between these objects is not required.

Modifying the Post-Processing Program

In the embodiment described above, PP command buffer 129 is generally not updated on a per-frame basis. PP command buffer 128 may be updated, e.g., by a graphics driver operating on CPU 102 of FIG. 1, at any time when post-processing object 134 is idle, but such updates are not synchronized with display of any particular image. Instead, updates to PP command buffer 129 generally take effect with the next frame after the update. If multiple updates are made, it is not guaranteed that all of the updates will take effect on the same frame.

In other embodiments, it is possible to synchronize a change in post-processing operations with a particular image. This optional feature also allows multiple updates to be controlled to take effect on the same frame. Such synchronization can be provided, e.g., by implementing multiple PP command buffers 129, with rendering object 132 controlling the content of the PP command buffers 129 as well as selection of which PP command buffer 129 should be read at any given time.

Figure 6:
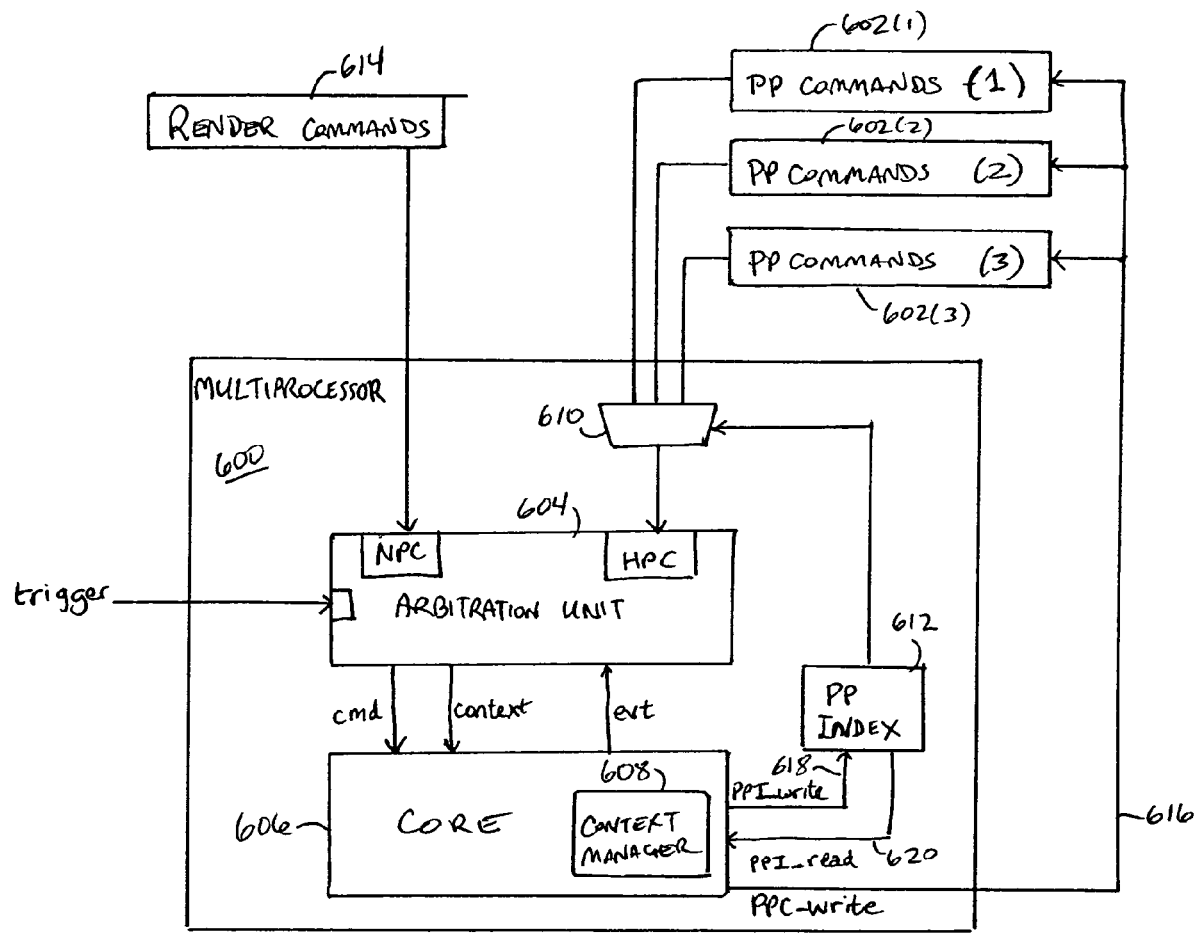
FIG. 6 is a block diagram showing components of a multiprocessor according to another embodiment of the present invention.

FIG. 6 is a simplified block diagram of a multiprocessor 600 according to an embodiment of the present invention that implements multiple PP command buffers 602(1)-602(3). Multiprocessor 600 includes an arbitration unit 604 and an execution core 606 with a context manager 608. These components may be generally similar to arbitration unit 402, execution core 404, and context manager 406 described above; thus, host 600 provides an HPC that implements post-processing object 134 and an NPC that implements rendering object 132. Multiprocessor 600 also includes additional logic for controlling selection among PPC command buffers 602(1)-602(3).

More specifically, each of PP command buffers 602(1)-602(3) supplies a candidate post-processing command to a selection circuit (e.g., a multiplexer) 610. Selection circuit 610 selects one of the candidates in response to a "PP index" value stored in a PP index register 612 of host 600. The selected candidate is presented as the HPC candidate instruction to arbitration unit 604. Arbitration unit 604 can select between the HPC and NPC candidate instructions as described above.

Figure 7:
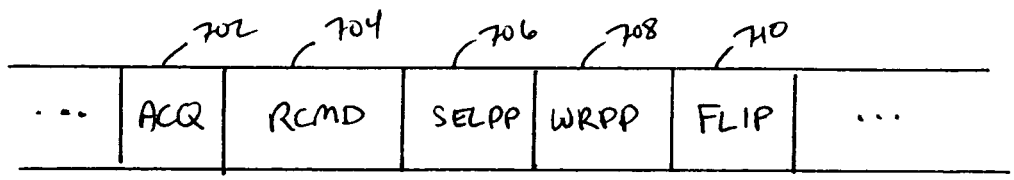
FIG. 7 illustrates a rendering command stream with commands for writing a post-processing program according to an embodiment of the present invention.

PP index register 612 is written by the NPC in response to special commands that may be included in the rendering command stream delivered to host 600 via rendering command buffer 614. FIG. 7 illustrates a portion of a rendering command stream 700 that includes suitable commands. In stream 700, ACQ command 702, RCMD commands 704, and FLIP command 710 are generally similar to commands described above with reference to FIG. 3A. PP command buffer selection ("SELPP") command 706 and PP command buffer write ("WRPP") command 708 implement changes in the post-processing operations that are synchronized with a particular image.

More specifically, SELPP command 706 instructs rendering object 132 (implemented in the NPC) to select an available one of PP command buffers 602(1)-602(3) to be written. A semaphore mechanism similar to semaphores 207 described above (FIG. 2) or other control mechanisms may be used to prevent rendering object from selecting a PP command buffer 602 that is still in use by post-processing object 134.

WRPP command 708 is advantageously accompanied by data (not explicitly shown in FIG. 7) in the form of a post-processing program (or a portion thereof) to be written to the selected PP command buffer 602. The program may have the form shown in FIG. 3B or a different form, as desired. Rendering object 132 executes WRPP command 708 by writing the associated program to the selected PP command buffer 602 via "PPC_write" path 616 shown in FIG. 6. Path 616 may include suitable circuitry (not shown) for selectably directing program information to only one of PP command buffers 602(1)-603(3); such circuitry may be of conventional design. In some embodiments, an index entry identifying an image buffer that was just completed by rendering object 132 is also written to the selected PP command buffer 602 during execution of WRPP command 708.

Thereafter, rendering object 132 executes the FLIP command 710 and writes an identifier of the selected PP command buffer 602 into PP index register 612 via "PPI-write" path 618. Appropriate interlocks (e.g., latches or transmission gates controlled by arbitration unit 604) may be provided along path 618 so that updates to PP index register 612 do not take effect while the HPC is active. For instance, execution of the PP index write operation by rendering object 132 may be stalled while PP index register 612 is in use (locked) by post-processing object 134. It should be noted that in this embodiment, the WRPP command may include writing an appropriate index value into the selected PP command buffer 602; a separate index update operation is not required.

Post-processing object 134 (implemented in the HPC) keeps track of which PP command buffer 602 was read on its last iteration and also has read access to PP index register 612 via "PPI-read" path 620. Accordingly, post-processing object 134 can determine whether the current PP command buffer 602 (specified by PP index register 612) and the last-read PP command buffer 602 are the same; if not, then post-processing object 134 unlocks the semaphore for the last-read PP command buffer 602 or otherwise frees the last-read PP command buffer 602 for rewriting.

In some embodiments, SELPP command 706 and WRPP command 708 are included in rendering command stream 700 only for images where the post-processing program is to be changed. For other frames, these commands may be omitted, in which case FLIP command 710 advantageously does not change the value stored in PP index register 612. Instead, an index update for the current PP command buffer 602 may be executed. Thus, the same PP command buffer 602 can be used for any number of consecutive frames, with a new PP command buffer 602 being used only when the post-processing program is actually changed.

In another embodiment, a post-processing program in a PP command buffer 602 is incrementally updated by WRPP commands rather than being completely rewritten. For instance, at initialization, each PP command buffer 602 may be loaded with the same "default" post-processing program. Rendering object 132 modifies portions of the program (e.g., parameters for various operations) as needed and updates the index value. The SELPP and WRPP commands described above may be adapted for this embodiment, e.g., with WRPP commands specifying an entry in the selected PP command buffer 602 to be overwritten as well as the new commands (or just parameter values).

Persons of ordinary skill in the art will recognize that other synchronization schemes are also possible. For instance, information about which PP command buffer should be read next may be stored in the arbitration unit, in memory in the HPC context, or elsewhere as desired.

Multiple Display Heads

As is known in the art, some GPUs are designed with multiple display heads to drive multiple display devices. A separate scanout engine is usually provided for each display head, since different display devices may operate at different pixel or frame rates or may have different pixel format requirements.

Figure 8:
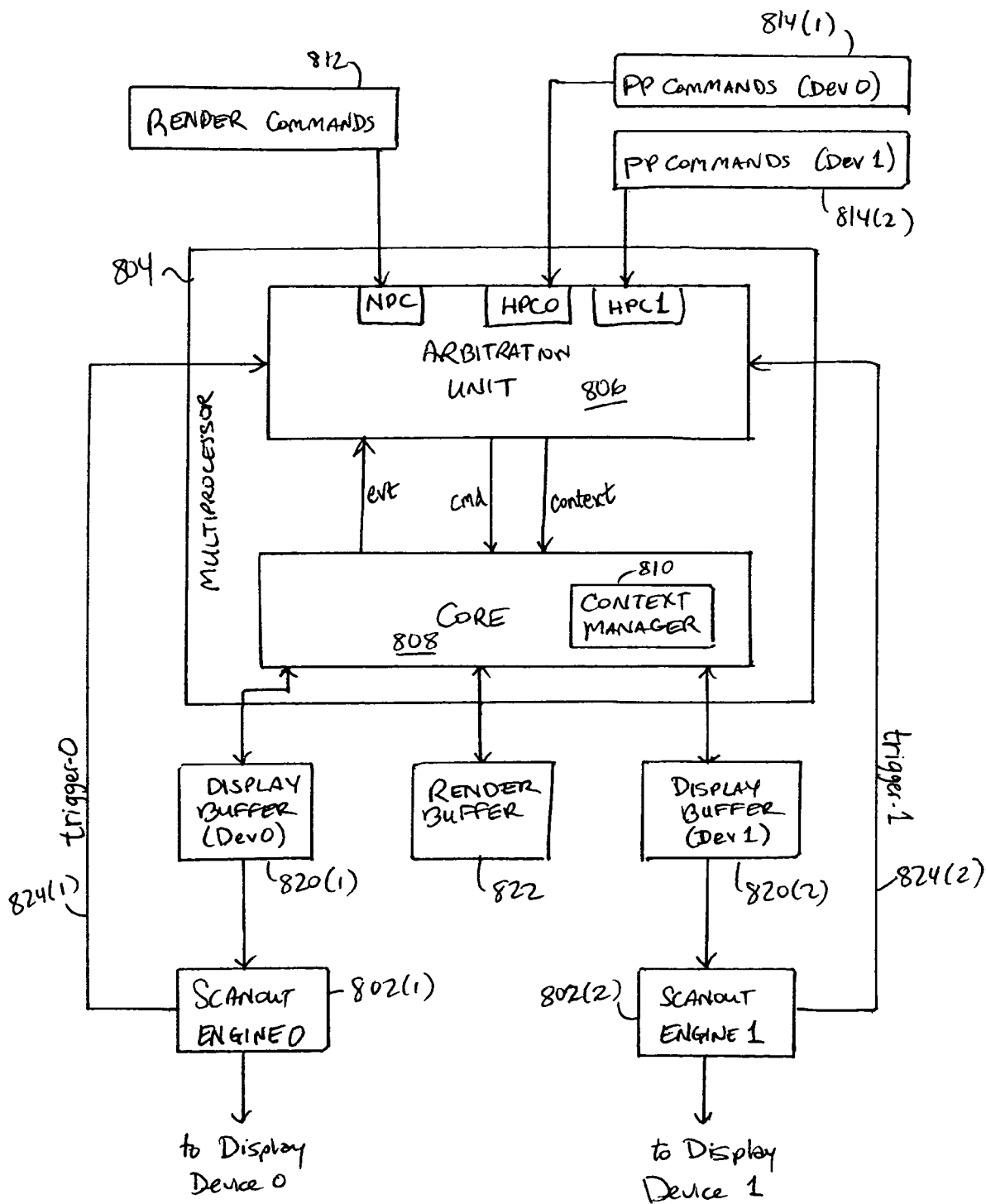
FIG. 8 is a block diagram of a multiprocessor that supports two scanout engines according to an embodiment of the present invention.

FIG. 8 is a simplified block diagram illustrating a multiprocessor 804 that supports a first scanout engine 802(1) for driving a display device "0" (not explicitly shown) and a second scanout engine 802(2) for driving a display device "1" (also not explicitly shown) according to an embodiment of the present invention. Multiprocessor 804 includes an arbitration unit 806 and an execution core 808 that includes a context manager 810. These components may be generally similar to corresponding components in FIG. 4, except that multiprocessor 804 supports two HPCs (denoted herein as HPC0 and HPC1) and one NPC. Each HPC implements a different post-processing object; HPC0 for a display device "0" and HPC1 for a display device "1"; the NPC contains an instantiated rendering object that provides images to be consumed by both post-processing objects. In some embodiments, there may be multiple rendering objects, with images generated by the rendering objects being consumed by one or more of the post-processing objects in any manner desired. Accordingly, execution core 808 supports at least three contexts, and arbitration unit 806 performs three-way (or more) arbitration as described below.

Each scanout engine 802(1), 802(2) operates with appropriate parameters (e.g., pixel rate, frame rate) for its respective display device. Since post-processing operations for different display devices may be different, the post-processing object implemented in HPC0 advantageously writes frames to display buffer 820(1) while the post-processing object implemented in HPC1 writes frames to a physically or logically separate display buffer 820(2). Display buffer 820(1) is read by scanout engine 802(1), and display buffer 820(2) by scanout engine 802(2). HPC0 and HPC1 may both read from the same rendering buffer 822 and may read the same image or different images stored therein, or they may read from different rendering buffers 822.

Arbitration unit 806 receives a candidate command stream for the NPC via a rendering command buffer 812, a candidate command stream for HPC0 via a PP command buffer 814(1), and a candidate command stream for HPC1 via a PP command buffer 814(2). In general, PP command buffers 814(1), 814(2) may provide different post-processing programs as the desired post-processing operations for different display devices may be different.

Arbitration unit 806 receives trigger signals independently from each scanout engine 802: a "trigger-0" path 824(1) provides trigger signals from scanout engine 802(1), and a "trigger-1" path 824(2) provides trigger signals from scanout engine 802(2). In response to the trigger-0 signal, arbitration unit 806 switches in HPC0, which runs to completion of a frame (as in other embodiments described above), and in response to the trigger-1 signal, arbitration unit 806 switches in HPC1, which also runs to completion of a frame.

In some instances, overlapping trigger events are possible. For example, arbitration unit 806 may switch in HPC0 in response to the trigger-0 signal, then receive the trigger-1 signal before HPC0 has finished its frame. In one embodiment, arbitration unit 806 allows HPC0 to finish its frame, then immediately switches in HPC1. Similar logic may also be used to handle the other overlap scenario, in which the trigger-1 signal arrives first. This algorithm is effective as long as the total time required for HPC0 and HPC1 to each generate a frame is substantially less than a frame time (at the faster frame rate if the two display devices have different frame rates) and so long as the NPC is left with enough processing time to render new images at an acceptable rate.

In other embodiments, some or all of the various objects may be implemented in separate processing engines, increasing the parallel processing capacity. For instance, with three engines, the NPC and two HPCs may each be implemented in separate engines.

In another embodiment, multiple display heads can be supported by providing two scanout engines and a single HPC, with one of the scanout engines having exclusive use of the HPC. The scanout engine for the other display head may implement limited post-processing capability using conventional special-purpose circuits if desired. In yet another embodiment, a single HPC can be triggered by trigger signals from either of two (or more) scanout engines.

Examples of Post-Processing

As noted above, post-processing may include a wide variety of operations. Without limiting the scope of the present invention, some examples of post-processing operations will now be described.

Figure 9:
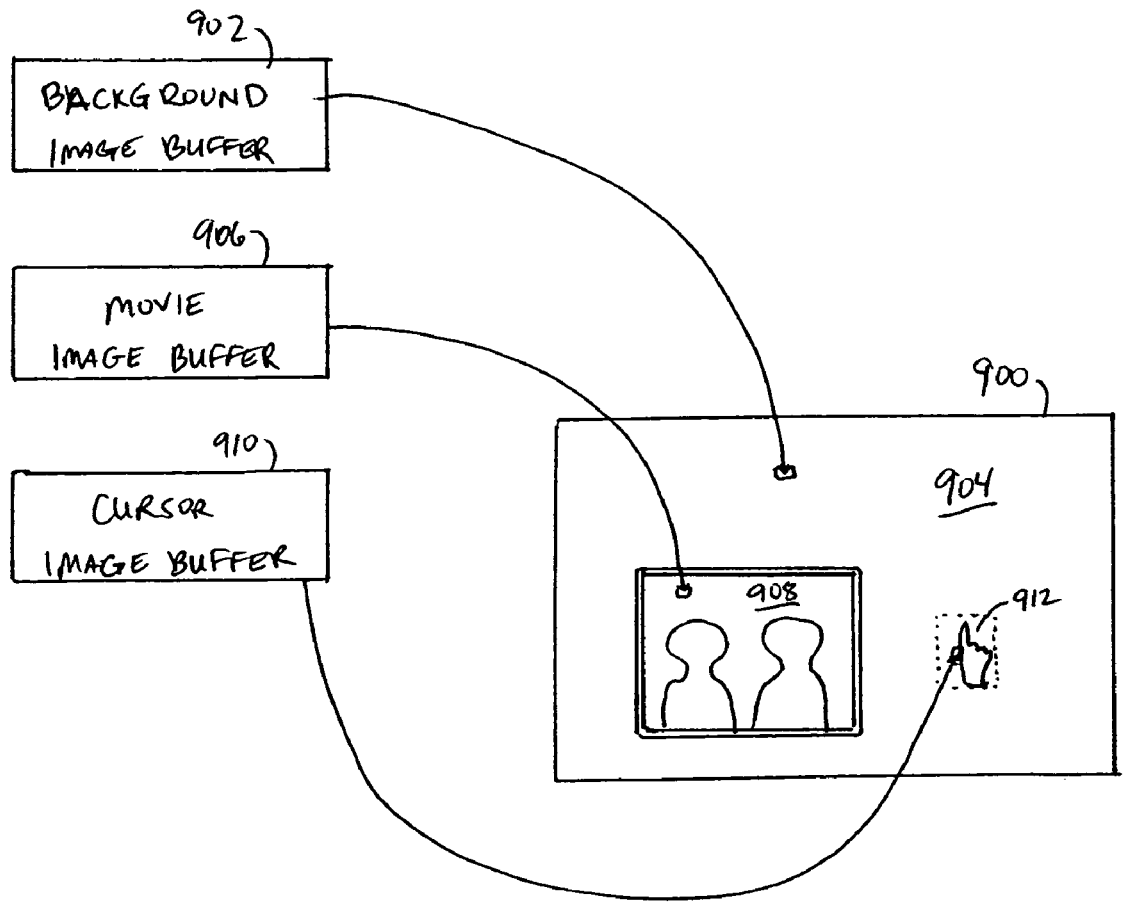
FIG. 9 illustrates a composite image.

One post-processing operation is compositing, in which images from different buffers can be superimposed on each other to generate a frame. For example, FIG. 9 illustrates a composite frame 900 generated from three different image buffers. A background image buffer 902 provides fragment data used to generate the pixels in a background region 904, a movie image buffer 906 provides fragment data used to generate the pixels in a movie region 908, and a cursor image buffer 910 provides fragment data used to generate the pixels in a cursor region 912.

In this example, the content and/or position of any of the images can independently vary from frame to frame, and the update rate for different images may be different. For example, the background image in region 904 may be desktop wallpaper that rarely changes, the movie image in region 908 may change at a rate of 30 Hz or higher, and the content of cursor image buffer 910 may also change in substantially real time, e.g., to indicate current system activity. The position of cursor region 912 may also change in substantially real time to reflect motion of a pointing device operated by a user.

Figure 10:
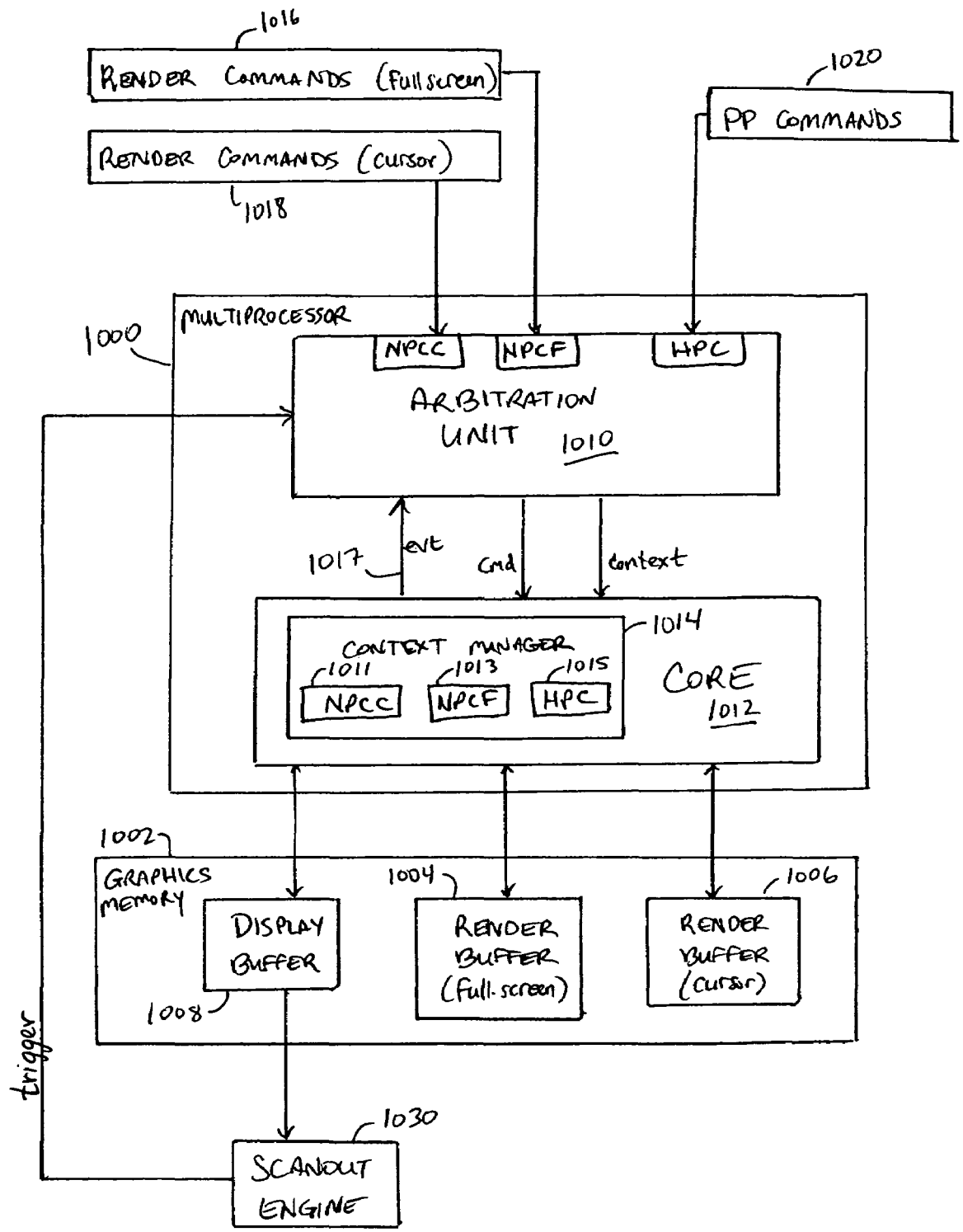
FIG. 10 is a block diagram of a multiprocessor that supports composite images according to an embodiment of the present invention.

In accordance with an embodiment of the present invention, composite images can be generated by supplying multiple independent image buffers (or groups of image buffers) as fragment data sources for a post-processing object. FIG. 10 is a block diagram showing a multiprocessor 1000 that is configured to generate multiple images independently. In this embodiment, multiprocessor 1000 supports one HPC that implements a post-processing object and two NPCs: NPCF implements a rendering object for a full-screen image, and NPCC implements a rendering object for a cursor image. It is to be understood that while two NPCs are illustrated in FIG. 10, any number of NPCs may be provided to generate any number of image sources that it may be desired to combine. Further, the objects may be implemented using any number of distinct processing engines; for instance, one engine might implement all three objects, a separate engine might be provided for each object, or multiple engines might be provided per object.

Graphics memory 1002, which may be generally similar to graphics memory 116 described above, includes two render buffers 1004, 1006, each of which advantageously stores multiple images as described above. Render buffer 1004 stores fragment data for full-screen images rendered by NPCF while render buffer 1006 stores fragment data for cursor images rendered by NPCC. It should be noted that cursor images may include far fewer fragments than full-screen images; accordingly, render buffer 1006 may be considerably smaller than render buffer 1004. Graphics memory 1002 also includes a display buffer 1008 that stores pixel data for frames generated by the HPC.

Host 1000 includes an arbitration unit 1010 and an execution core 1012 with a context manager 1014 that may be generally similar to corresponding components described above. In this instance, context manager 1014 stores three different contexts (NPCC context 1011, NPCF context 1013, and HPC context 1015), and arbitration unit 1010 selects among three different contexts. Separate rendering command streams for the full-screen image and the cursor image are provided via respective rendering command buffers 1016 (for full-screen images) and 1018 (for cursor images). These rendering streams may be generally similar to rendering stream 300 of FIG. 3A.

Arbitration unit 1010 selects the HPC in response to trigger signals from scanout engine 1030 (as described above) and selects between NPCC and NPCF when the HPC is idle. Round-robin selection, event-driven selection (e.g., based on event signals received from execution core 1012 via "evt" path 1017), or other selection algorithms may be used.

Figure 11:
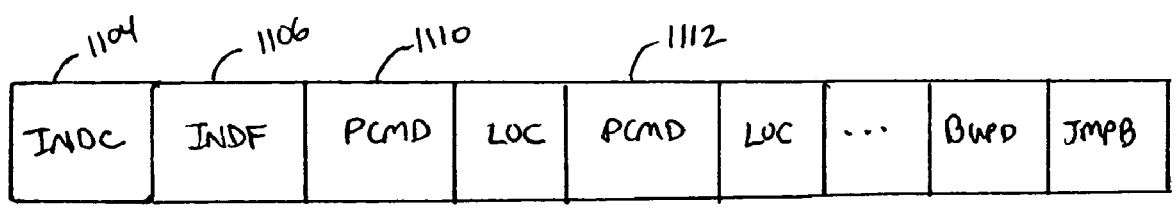
FIG. 11 illustrates a post-processing program for forming a composite image according to an embodiment of the present invention.

PP command buffer 1020 supplies a post-processing program, an example of which is illustrated in FIG. 11. Post-processing program 1100 is generally similar to post-processing program 320 of FIG. 3B, except that multiple index entries 1104, 1106 are provided. Index entry 1104 stores a cursor index value (INDC) that is updated by NPCC upon completion of a new cursor image, while index entry 1106 stores a full-screen index value (INDF) that is updated by NPCF upon completion of a new full-screen image. It should be noted that INDC and INDF values may be updated independently of each other and at different rates.

In this embodiment, the post-processing object advantageously generates a new frame every time it is triggered, regardless of whether either index entry has changed. This ensures that the on-screen cursor position will be updated at the display cadence, as is often desirable.

In one embodiment, PCMD commands 1110, 1112 include commands for reading a current cursor position from appropriate registers (which may be of conventional design) or from a memory location; determining the current cursor size (which may be set, e.g., by a command in PP command buffer 1020); determining which pixels are within the cursor area; and selecting one or more fragments for each pixel from either the current cursor image (identified by index value INDC) or the current full-screen image (identified by index value INDF) depending on which pixels are within the cursor area. The compositing algorithm itself may be similar to existing hardware-based algorithms, but is advantageously implemented in program code that can be executed in execution core 912 rather than in dedicated hardware. Features such as transparency or edge blending between the cursor and underlying portions of the full-screen image may also be implemented via suitable program code.

Referring again to FIG. 10, scanout engine 1030 may be identical to various scanout engines described above. In this embodiment, all compositing is done in host 1000 by the post-processing object in the HPC, and operation of scanout engine 1030 is independent of how the pixels in display buffer 1008 were generated.

Another post-processing operation is LCD overdrive (also referred to in the art as "LCD feed-forward" or "response time compensation" (RTC)). As is known in the art, an LCD screen can be made to respond faster if the signals driving the pixel are adjusted from frame to frame based in part on the desired new intensity and in part on the difference between the desired new intensity and the previous intensity. In accordance with an embodiment of the present invention, LCD overdrive can be implemented in a post-processing object executing a post-processing program that includes appropriate commands.

Figure 12:
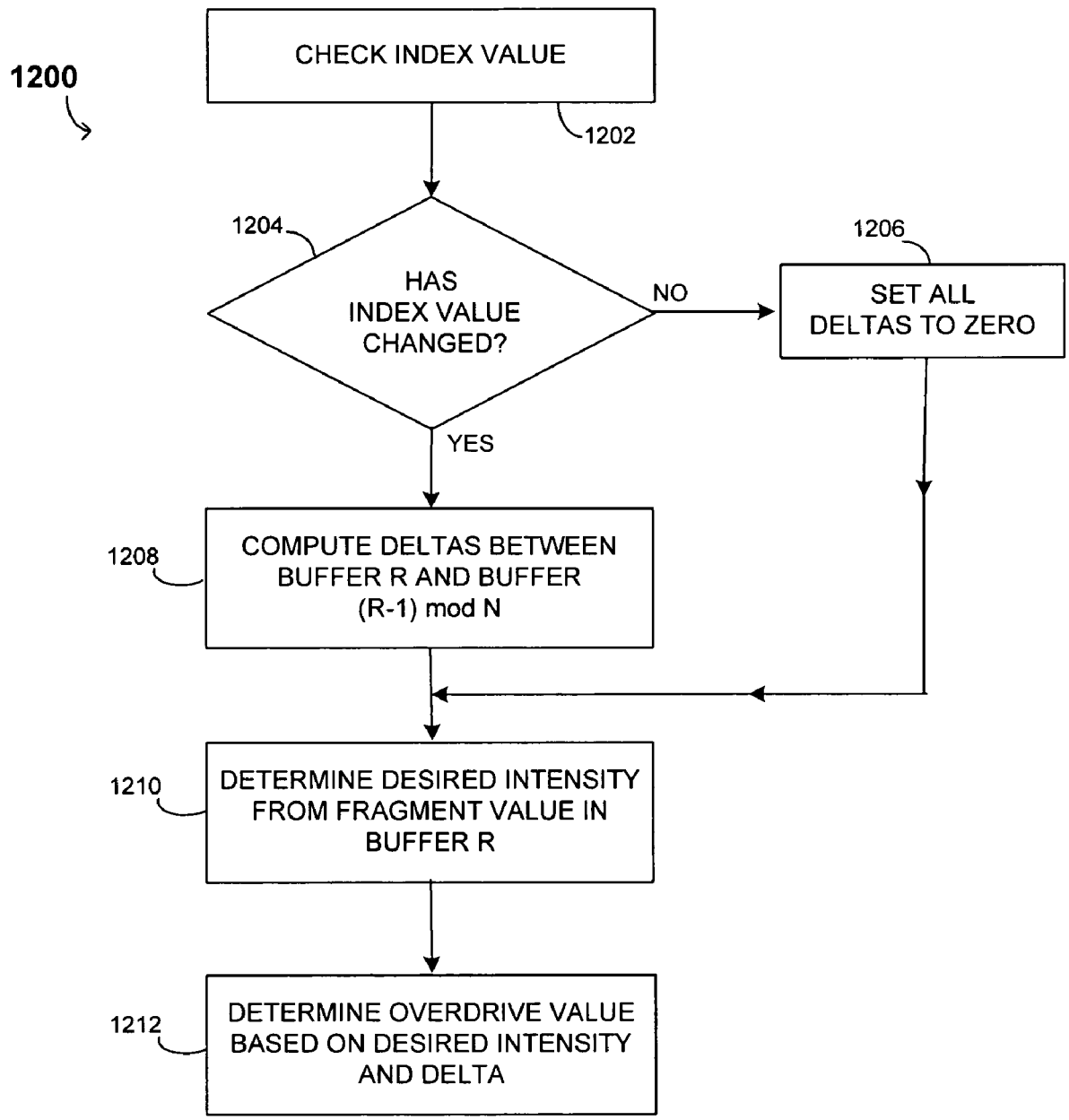
FIG. 12 is a flow diagram of a process for generating LCD overdrive values according to an embodiment of the present invention.

For example, consider a situation where each fragment of an image corresponds to one pixel of a frame. (The present invention is not limited to this case; it is used here for purposes of illustration.) FIG. 12 illustrates a process 1200 for generating a frame that may be implemented in post-processing object 134 (see, e.g., FIG. 2) via a suitable post-processing program (e.g., as shown in FIG. 3B). Process 1200 is advantageously implemented in an embodiment in which the most recently completed image is stored in an image buffer 226 (FIG. 2) that has index value R and the immediately preceding image is stored in a different image buffer 226 that has index value (R−1) mod N; both of these image buffers 226 are kept locked by post-processing object 134.

At step 1202, post-processing object 134 checks the index entry in PP command buffer 129. At step 1204, it is determined whether the index value has changed. If not, then at step 1206, delta values for all pixels in the frame are set to zero, reflecting that none of the desired pixel values have changed. If the index value has changed, then at step 1208, a delta value is computed for each pixel based on a fragment value in buffer R and a fragment value in buffer (R−1) mod N. In one embodiment, the delta value is simply the difference between values for corresponding fragments in the two buffers.

At step 1210, a desired pixel intensity is determined from the fragment value in buffer R. In one embodiment, the fragment value is the desired pixel intensity; in other embodiments, the desired pixel intensity is a function of the fragment value (e.g., incorporating gamma correction).

At step 1212, an overdrive value for the pixel is determined based on the desired intensity and the delta value. In one embodiment, a function may be prescribed for computing the overdrive signal. In another embodiment, overdrive signals may be determined from a lookup table that is indexed using the desired intensity and delta value (or the new and old intensity values); the execution core 404 may include a functional unit configured to perform the table lookup.

It will be appreciated that process 1200 is illustrative and that variations and modifications are possible. The steps may be executed sequentially for each fragment or in parallel for groups of fragments (or for all fragments), order of steps may be varied, and steps may be modified or combined. Different definitions of the delta values may be substituted, and other modifications to the fragment values may also be introduced. In addition, process 1200 can be combined with additional steps for generating pixel data from fragment data (e.g., downfiltering, upfiltering, compositing, and so on).

It is to be understood that the overdrive signal generated for a pixel by process 1200 is not necessarily the final pixel value that would be stored in a frame buffer 227. Subsequent manipulation may be implemented using additional post-processing commands.

A third example of a post-processing operation is surface rotation, in which the fragment data for an image is mapped onto a 2-D surface that has been rotated through some angle (e.g., a multiple of 90°) about an axis normal to the image. The intersection point of the axis with the image plane and/or the angle of rotation may be configurable parameters. In one embodiment, the intersection point is fixed at (or near) the center of the image, and the angle is a configurable multiple of 90° (e.g., 0°, 90°, 180°, 270°). Based on the intersection point and the angle of rotation, each fragment location in the image buffer can be mapped to a corresponding pixel location in the frame buffer. Accordingly, surface rotation can be implemented in a post-processing object by defining a mapping between fragment locations and pixel locations and using the mapping to determine a write address for each pixel based on the address from which a fragment was read. The mapping can be provided, e.g., as a lookup table accessible by a location offset for the image buffer or as a formula for computing a location offset for the pixel buffer from a location offset for the image buffer. In one embodiment, mappings for a number of allowed rotation angles may be provided using a lookup table accessible by image buffer location offset and a current rotation angle.

Figure 13:
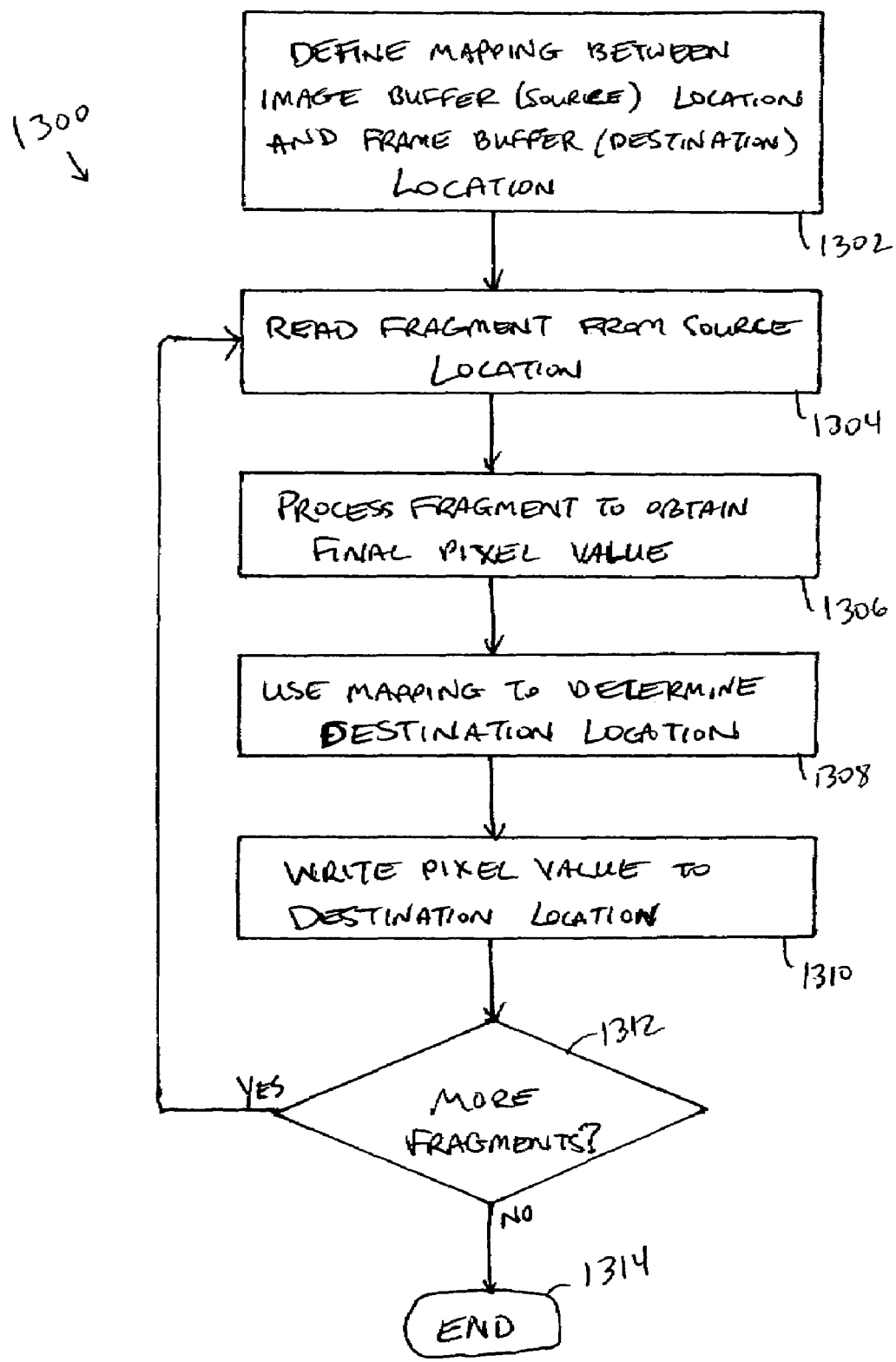
FIG. 13 is a flow diagram of a process for rotating an image according to an embodiment of the present invention.

FIG. 13 is a flow diagram of a process 1300 for generating a rotated frame that may be implemented in post-processing object 134 (see, e.g., FIG. 2) via a suitable post-processing program (e.g., as shown in FIG. 3B). At step 1302, based on the desired rotation, a mapping is defined between each fragment location in the image buffer and a corresponding pixel location in the pixel buffer. The mapping may be defined once, e.g., during initialization of the rendering object, and updated only when rotation parameters change. In one embodiment, a post-processing command is used to supply the mapping; in another embodiment, the post-processing commands supply parameters that the post-processing object can use to compute or select the appropriate mapping.

At step 1304, fragment data is read from an image buffer location (referred to herein as a source location), and at step 1306 the fragment data is processed to generate a pixel value. Any type of post-processing operation may be included at step 1306, including, e.g., compositing and/or LCD overdrive operations. Once processing is completed, at step 1308 a destination location in the frame buffer is determined for the pixel value by using source location and the mapping defined at step 1302. At step 1310, the pixel value is written to the destination location. At step 1312, it is determined whether more fragments remain to be processed. If so, process 1300 returns to step 1304 to process the next fragment; when all fragments for the current image have been processed, process 1300 ends (step 1314).

It will be appreciated that process 1300 is illustrative and that variations and modifications are possible. Steps described as sequential may be executed in parallel, order of steps may be varied, and steps may be modified or combined. For instance, multiple fragments may be processed in parallel. In some embodiments, the mapping between source locations and destination locations might not be one-to-one; for instance, the rotated mage might also be reduced or enlarged to fit the dimensions of the pixel array. Reduction or enlargement may involve blending several fragment values to generate one pixel value. Process 1300 may be adapted for this case, as long as the location of one fragment can be used as the source location for purposes of defining a mapping to a pixel. In other embodiments, the mapping may be defined such that one or more source locations to be used for each pixel location are identified.

The compositing and LCD overdrive operations are used herein as examples of operations that can be implemented in a post-processing object. Other operations may also be implemented in addition to or instead of these examples; some examples are described above in the "Overview and Terminology" subsection, but the invention is not limited to particular post-processing operations. Persons of ordinary skill in the art will recognize that a post-processing object can advantageously be used to implement any operation whose execution at the display cadence is desirable or necessary for correct behavior. The number and complexity of operations included in a post-processing object may be varied as long as new frames can be generated at the display cadence.

Sources for Post-Processing Programs

As described above, post-processing programs are written to a PP command buffer by a graphics driver program. The driver may write the commands directly (e.g., by transferring commands over system bus 106 into the memory location of PP command buffer 129 in the embodiment of FIG. 1) or indirectly (e.g., by writing a WRPP command to rendering command buffer 128 as described above with reference to FIG. 7).

Sources for post-processing programs will now be described. In some embodiments, the graphics driver assembles post-processing programs from a library of pre-defined program segments that implement various post-processing operations. The graphics driver may provide a suitable application program interface (API) allowing application developers to specify the post-processing operations they wish to use and any relevant parameters. The API itself may be generally similar to conventional APIs for controlling scanout-time processing, but the implementation within the graphics driver is different. Specifically, in response to the API instructions, the graphics driver selects appropriate program segments from the library, assembles the segments into a complete program (e.g., adding control commands such as index-checking and jump commands described above), and writes the program to the PP command buffer or inserts appropriate WRPP commands into the rendering command stream.

In other embodiments, application developers may be able to define "custom" post-processing programs. For example, the graphics driver may provide an API that accepts an arbitrary post-processing program or program segment from an application or operating system program. A developer's kit with instructions and/or suggestions for writing custom post-processing programs may also be provided. In still other embodiments, a combination of library program segments and custom program segments may be supported.

In the embodiments described above, the graphics driver is identified as writing the post-processing programs to the PP command buffer. In some embodiments, the graphics driver program is implemented at a level of abstraction that hides details of the hardware and/or operating system on which the driver program is executed. For example, a resource manager program may be provided to support interactions of the graphics driver program with system hardware components. The resource manager implements low-level hardware and operating-specific functionality that is invoked by the graphics driver program in response to processing requests from operating system programs and/or application programs. This extra level of abstraction allows the same driver code to be adapted to different hardware configurations by providing a different implementation of the resource manager. Where a resource manager is implemented, the actual writing of post-processing programs to the PP command buffer may be handled by the resource manager so that it is transparent to the driver.

In yet another embodiment, conventional scanout control commands can be issued by the driver. Such commands are received by a suitable command interface component within the GPU and converted to control structures for the post-processing object. For example, upon receipt of a scanout command, the command interface component may write or overwrite commands or parameters in the PP command buffer, or it may insert appropriate SELPP and/or WRPP commands into the rendering command stream. Thus, the PP command buffer and the post-processing object may be made transparent to the graphics driver (including the resource manager), and the present invention may be used with unmodified conventional graphics drivers. It will be appreciated that control structures other than a PP command buffer, operated by a suitable command interface component of the GPU, may be used to control behavior of the post-processing object.

Further Embodiments

As described above, embodiments of the present invention allow the massive processing power available in the execution core of a GPU to be leveraged for pixel processing at display cadence. Further, the programmability of the post-processing objects described herein provides considerably more flexibility as to the amount and type of display post-processing that can be performed than can be achieved with conventional special-purpose circuits. Moreover, some embodiments of the present invention allow the amount of special-purpose post-processing circuitry in conventional GPUs to be considerably reduced or eliminated, providing benefits in chip area and power consumption.

While the invention has been described with respect to specific embodiments, one skilled in the art will recognize that numerous modifications are possible. For instance, the invention is not limited to any particular execution core or context management architecture. In addition, while specific examples of post-processing operations have been described, it is to be understood that any operation or combination of operations, including operations not specifically mentioned herein, may be implemented within the scope of the present invention.

The description herein makes reference to processing objects, such as rendering objects and post-processing objects. In this context, "object" is to be understood as referring to an entity with state and behavioral aspects. Persons of ordinary skill in the art will recognize that multiple objects can be implemented in a multiprocessor in a variety of ways. For example, a single processing engine can be implemented with context-switching features to allow different objects to be switched in and out as appropriate. Alternatively, any or all of the objects referred to herein may be implemented using separate processing engines capable of realizing the state and behavioral aspects of the object.

Further, while the present invention has been described with reference to specific hardware and software components, those skilled in the art will appreciate that different combinations of hardware and/or software components may also be used, and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as CD (compact disk) or DVD (digital versatile disk), flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A graphics processor comprising:
   a multiprocessor configured to execute a plurality of objects including:
      a rendering object configured to execute a first sequence of program instructions for generating image data and to write the image data to a render buffer; and
      a post-processing object configured to:
      read the image data from the render buffer;
      execute a second sequence of program instructions for generating a frame of pixel data from the image data; and
      write the pixel data to a display buffer, wherein the post-processing object and the rendering object do not share circuitry; and
   a scanout engine configured to isochronously transmit frames of generated pixel data to a display port and coupled to periodically transmit a trigger signal to the multiprocessor,
   wherein the multiprocessor is further configured to operate the post-processing object to generate a new frame of pixel data in response to the trigger signal.

2. The graphics processor of claim 1, wherein the multiprocessor includes:
   a first programmable processing engine configured to execute the rendering object; and
   a second programmable processing engine configured to execute the post-processing object.

3. The graphics processor of claim 1, wherein the multiprocessor includes:
   a context-switchable processing core;
   a context manager configured to maintain a respective context corresponding to each of the plurality of processing objects; and
   an arbitration unit configured to control selection of a current context from among the contexts maintained by the context manager such that a context corresponding to the post-processing object is activated in response to the trigger signal.

4. A graphics processor comprising:
   a programmable execution core configured to be switchable among a plurality of contexts and further configured to execute program instructions associated with a switched-to one of the plurality of contexts,
   an arbitration unit coupled to the execution core and configured to control switching of the execution core between different ones of the plurality of contexts, and
   a scanout engine configured to isochronously transmit frames of generated pixel data to a display port and coupled to transmit a trigger signal to the arbitration unit, wherein the plurality of contexts includes:
- a rendering context having associated therewith a first sequence of program instructions for generating image data; and
- a post-processing context having associated therewith a second sequence of program instructions for generating a frame of pixel data from the image data; and wherein the arbitration unit is further configured to switch the execution core to the post-processing context in response to the trigger signal.

5. The graphics processor of claim 4 wherein the scanout engine is further configured to transmit the trigger signal once per frame.

6. The graphics processor of claim 5 wherein the scanout engine is further configured such that the trigger signal has a substantially fixed time relationship to an end-of-frame event.

7. The graphics processor of claim 4 wherein the arbitration unit is further configured to maintain the execution core in the post-processing context until a frame completion event is detected in the second stream of program instructions and thereafter to switch the execution core to the rendering context.

8. The graphics processor of claim 7 wherein the frame completion event corresponds to an occurrence, in the second stream of program instructions, of an unconditional jump instruction targeting a beginning point of the second stream of program instructions.

9. The graphics processor of claim 4 wherein the first sequence of program instructions further includes instructions for selecting one of a plurality of image buffers and for writing the image data to the selected image buffer.

10. The graphics processor of claim 9 wherein the second sequence of program instructions further includes instructions for reading the image data from one or more of the plurality of image buffers.

11. The graphics processor of claim 10 wherein:
the first sequence of program instructions further includes an instruction to write an index value for the selected image buffer into an index location, wherein the instruction to write the index value is executed after execution of the instructions for writing the image data to the selected image buffer; and
the second sequence of program instructions further includes an instruction to read the index value from the index location.

12. The graphics processor of claim 11 wherein the second sequence of program instructions further includes at least one instruction that is conditional upon whether the index value read from the index location is different from an old index value previously read from the index location.

13. The graphics processor of claim 12 wherein the at least one conditional instruction includes an instruction to release one of the plurality of image buffers for subsequent use by the rendering context.

14. The graphics processor of claim 4 wherein the second sequence of program instructions includes instructions for selecting one of a plurality of frame buffers and for writing pixel data for a frame to the selected frame buffer.

15. The graphics processor of claim 14 wherein:
the scanout engine is further configured to read a display index value from a first location, the display index value identifying one of the plurality of frame buffers, and to read pixel data for a frame from the identified frame buffer; and
the second sequence of program instructions further includes instructions for writing the display index value corresponding to the selected frame buffer to the first location after completion of writing the pixel data for the frame to the selected frame buffer.

16. The graphics processor of claim 4 wherein the post-processing context does not perform any rasterizing operation on the image data to generate a frame of pixel data from the image data.

17. A graphics processing system comprising:
a graphics memory including:
- a plurality of image buffers, each configured to store fragment data for an image; and
- a plurality of frame buffers, each configured to store pixel data for a frame; and a multiprocessor including:
- a programmable execution core configured to be switchable among a plurality of contexts such that the execution core executes program instructions associated with a switched-to one of the plurality of contexts; and
- an arbitration unit coupled to the execution core and configured to control switching of the execution core between different ones of the plurality of contexts; and a scanout engine configured to isochronously transmit frames of pixel data from the frame buffers to a display port and coupled to periodically transmit a trigger signal to the arbitration unit of the multiprocessor, wherein the plurality of contexts includes:
- a rendering context having associated therewith a first sequence of program instructions for generating fragment data for a plurality of images and writing the fragment data for each image to one of the image buffers; and
- a post-processing context having associated therewith a second sequence of program instructions for generating a frame of pixel data from the fragment data in the image buffers and for writing the pixel data for the frame to one of the frame buffers; and wherein the arbitration unit receives a first candidate command from a rendering command buffer of the graphics processing system and receives a second candidate command from a post-processing command buffer of the graphics processing system and selects one of the candidate commands to send to the execution core, and wherein the arbitration unit is further configured to select the post-processing command and to switch the execution core to the post-processing context in response to the trigger signal.

18. The graphics processing system of claim 17, wherein the writing the fragment data for each image to one of the image buffers is synchronized with the post-processing context such that new fragment data is not written to an image buffer until the post-processing context has finished with any old fragment data in that image buffer.

19. A method for generating images, the method comprising:
operating, in a shared execution core of a processor, a rendering object that generates fragment data for images in response to a first sequence of program instructions;
in parallel with operating the rendering object, operating a scanout engine to isochronously deliver frames of pixel data to a display device, wherein the scanout engine periodically generates a trigger signal;
in response to the trigger signal, operating, in the shared execution core of the processor, a post-processing object that generates a new frame of pixel data from the fragment data for one or more images in response to a second sequence of program instructions; and making the new frame of pixel data available to the scanout engine.

20. The method of claim 19 wherein the trigger signal has a substantially fixed time relationship to an end-of-frame event.

21. The method of claim 19 wherein operation of the rendering object is suspended during operation of the post-processing object and is resumed after the post-processing object has completed generating the new frame of pixel data.

22. The method of claim 19 wherein the second sequence of program instructions includes instructions for downfiltering the fragment data for an image.

23. The method of claim 19 wherein the second sequence of program instructions includes instructions for upfiltering the fragment data for an image.

24. The method of claim 19 wherein the second sequence of program instructions includes instructions for computing an LCD overdrive value for each pixel of the frame.

25. The method of claim 19 wherein the second sequence of program instructions includes instructions for forming a composite image using fragment data for two or more different images.

26. The method of claim 19 wherein the second sequence of program instructions includes instructions for mapping the image onto a surface.

* * * * *